(12) United States Patent
Kubo et al.

(10) Patent No.: US 7,924,677 B2
(45) Date of Patent: Apr. 12, 2011

(54) OPTICAL RECORDING MEDIUM WITH POWER CALIBRATION AREAS AND A RECORDING METHOD THEREFOR WITH OPTIMUM POWER CONTROL

(75) Inventors: Hideyuki Kubo, Tokyo (JP); Hideharu Takeshima, Tokyo (JP)

(73) Assignee: Mitsubishi Kagaku Media Co., Ltd., Tokyo (JP)

( * ) Notice: Subject to any disclaimer, the term of this patent is extended or adjusted under 35 U.S.C. 154(b) by 0 days.

(21) Appl. No.: 12/699,290

(22) Filed: Feb. 3, 2010

(65) Prior Publication Data

US 2010/0135132 A1  Jun. 3, 2010

Related U.S. Application Data

(60) Continuation of application No. 12/108,200, filed on Apr. 23, 2008, now Pat. No. 7,839,737, which is a division of application No. 11/149,026, filed on Jun. 9, 2005, now Pat. No. 7,436,743, which is a continuation of application No. PCT/JP03/15985, filed on Dec. 12, 2003.

(30) Foreign Application Priority Data

Dec. 20, 2002  (JP) ................. 2002-370934
Apr. 1, 2003  (JP) ................. 2003-098320
Jul. 28, 2003  (JP) ................. 2003-202321

(51) Int. Cl.
*G11B 7/00* (2006.01)
(52) U.S. Cl. ........................ 369/94; 369/47.27
(58) Field of Classification Search ............. 369/47.5, 369/47.51, 47.52, 47.53, 275.3, 94, 47.1, 369/47.27, 44.26
See application file for complete search history.

(56) References Cited

U.S. PATENT DOCUMENTS

| 5,274,622 | A | 12/1993 | Kono |
| 5,608,715 | A | 3/1997 | Yokogawa et al. |
| 5,818,807 | A | 10/1998 | Kuroda et al. |
| 5,966,721 | A | 10/1999 | Hirayama et al. |
| 6,111,851 | A | 8/2000 | Ohki et al. |
| 6,404,707 | B1 | 6/2002 | Kaneda et al. |
| 6,411,575 | B1 | 6/2002 | Akiyama et al. |
| 6,424,614 | B1 | 7/2002 | Kawamura et al. |
| 6,549,722 | B2 | 4/2003 | Okada et al. |
| 6,845,071 | B2 * | 1/2005 | Shoji et al. ............. 369/47.53 |

(Continued)

FOREIGN PATENT DOCUMENTS

CN  1146586  4/1997

(Continued)

OTHER PUBLICATIONS

Notification of Reasons for Rejection dated Dec. 4, 2007, from the corresponding Japanese Application.

(Continued)

*Primary Examiner* — Nabil Z Hindi
(74) *Attorney, Agent, or Firm* — Katten Muchin Rosenman LLP

(57) ABSTRACT

In an optical recording medium having a plurality of recording layers on which information can be recorded by irradiating a laser beam from one side thereof, an optimum recording power to each of the recording layers can be determined. The optical recording medium has a plurality of recording layers on which information can be recorded by irradiating a laser beam from one side thereof, and each of the recording layers has a power calibration area (PCA) for optimizing the intensity of the laser beam.

10 Claims, 11 Drawing Sheets

U.S. PATENT DOCUMENTS

| | | |
|---|---|---|
| 6,912,188 B2 | 6/2005 | Morishima |
| 6,990,055 B1 | 1/2006 | Nakamura et al. |
| 7,123,556 B2 | 10/2006 | Ueda et al. |
| 7,184,377 B2 * | 2/2007 | Ito et al. ............ 369/47.14 |
| 7,376,058 B2 | 5/2008 | Narumi et al. |
| 7,525,888 B2 | 4/2009 | Ninomiya |
| 7,593,298 B2 | 9/2009 | Ueki |
| 2001/0007546 A1 | 7/2001 | Lee et al. |
| 2002/0031336 A1 | 3/2002 | Okada et al. |
| 2003/0058771 A1 | 3/2003 | Furukawa et al. |
| 2003/0063535 A1 | 4/2003 | Shoji et al. |
| 2003/0137915 A1 | 7/2003 | Shoji et al. |
| 2003/0185121 A1 | 10/2003 | Narumi et al. |
| 2005/0078578 A1 | 4/2005 | Sasaki |
| 2005/0259561 A1 | 11/2005 | Nakamura et al. |

FOREIGN PATENT DOCUMENTS

| | | |
|---|---|---|
| EP | 0715301 | 6/1996 |
| EP | 1244096 | 9/2002 |
| EP | 1318509 | 6/2003 |
| JP | 8212561 | 8/1996 |
| JP | 8235641 | 9/1996 |
| JP | 9007306 | 1/1997 |
| JP | 9063061 | 3/1997 |
| JP | 113550 | 1/1999 |
| JP | 1125608 | 1/1999 |
| JP | 11066622 | 3/1999 |
| JP | 11120617 | 4/1999 |
| JP | 11273082 | 10/1999 |
| JP | 2000-67511 | 3/2000 |
| JP | 2000-285609 | 10/2000 |
| JP | 2000311346 | 11/2000 |
| JP | 2001052337 | 2/2001 |
| JP | 2002358648 | 12/2002 |
| JP | 2004206849 | 7/2004 |
| WO | 97/15050 | 4/1997 |
| WO | 00/79525 | 12/2000 |
| WO | 0223542 | 3/2002 |
| WO | 0229791 | 4/2002 |

OTHER PUBLICATIONS

Supplementary European Search Report dated Oct. 2, 2007, from the corresponding European Application.
Chinese Office Action mailed on Sep. 1, 2006.
International Search Report dated Mar. 30, 2004.
Taiwanese First Notification of Reasons for Refusal dated Sep. 22, 2006.
Notification of Reason(s) for Rejection dated Mar. 25, 2008, for corresponding Japanese Patent Application JP 2003-416991.
European Search Report dated Sep. 30, 2008, from the corresponding European Application.
Notification of Reasons for Rejection dated Jan. 20, 2009 form the corresponding Japanese Application.
Non-final Office Action dated Oct. 30, 2009, from corresponding U.S. Appl. No. 12/108,200.
Non-final Office Action dated Jul. 13, 2007, from corresponding U.S. Appl. No. 11/149,026.
Non-final Office Action dated Aug. 30, 2007 from corresponding U.S. Appl. No. 11/149,026.
Final Office Action dated Dec. 14, 2007 from corresponding U.S. Appl. No. 11/149,026.
Non-final Office Action dated Dec. 3, 2008 from corresponding U.S. Appl. No. 12/108,200.
Final Office Action dated Aug. 5, 2009, from corresponding U.S. Appl. No. 12/108,200.

* cited by examiner

LASER BEAM

OPTICAL RECORDING MEDIUM WITH POWER CALIBRATION AREAS AND A RECORDING METHOD THEREFOR WITH OPTIMUM POWER CONTROL

CROSS-REFERENCE TO RELATED APPLICATIONS

This application is a continuation of and claims priority to U.S. Ser. No. 12/108,200, which was filed Apr. 23, 2008, which is pending, and which is hereby incorporated by reference in its entirety for all purposes.

U.S. Ser. No. 12/108,200 is a divisional application of and claims priority to U.S. Ser. No. 11/149,026, now U.S. Pat. No. 7,436,743, which was filed Jun. 9, 2005 and which is hereby incorporated by reference in its entirety for all purposes.

U.S. Ser. No. 11/149,026, now U.S. Pat. No. 7,436,743, is a continuation of and claims priority to PCT/JP03/15985, which was filed Dec. 12, 2003 and which is hereby incorporated by reference in its entirety for all purposes. PCT/JP03/15985 claims priority to JP 2002370934 filed Dec. 20, 2002, JP 2003098320 filed Apr. 1, 2003, and JP 2003202321 filed Jul. 28, 2003 and which are hereby incorporated by reference in their entirety for all purposes.

TECHNICAL FIELD

The present invention relates to an optical recording medium having a plurality of recording layers, on which recording or reading are performed from one side thereof, and a recording method and a recording apparatus for the optical recording medium.

BACKGROUND ART

Various types of optical recording media such as CD-R, CD-RW, DVD-R, DVD-RW, DVD-ROM, MO and so forth are widely recognized and spread as external storages for information processing apparatuses such as computers because they can store a large volume of information and can be randomly accessed easily. With an increase in quantity of handled information, there is a demand to increase the recording density.

Among various optical recording media, optical disks having a recording layer containing an organic dye (also referred to as a dye containing recording layer) such as CD-R, DVD-R, DVD+R and the like are particularly widely used because they are relatively inexpensive and have compatibility with read-only optical disks.

Media such as CD-R representative of optical disks having the dye containing recording layer, for example, are in a laminated structure which has a dye containing recording layer and a reflective layer in order on a transparent disk substrate along with a protective layer for covering the dye containing recording layer and the reflective layer. Recording or reading are performed with a laser beam through the substrate.

In such CD-R, a power calibration area (PCA) for optimization of the recording power of the laser beam (OPC: Optimum Power Control) is set in a portion on the inner peripheral side with respect to the lead-in area, as shown in FIG. 11, for example (refer to Japanese Unexamined Patent Publication No. HEI 9-63061, for example). The PCA is divided into an OPC area and an OPC management area. Each of the areas is comprised of one hundred partitions, and one partition is used in each area for one OPC process. At this time, the partitions in the OPC area are used from the outer peripheral side to the inner peripheral side, whereas the partitions in the OPC management area are used from the inner peripheral side to the outer peripheral side.

In the case of CD-R, when recording on the information recording area is performed with a laser beam, various powers of the laser beam are used to perform trial writing in the OPC area (for example, a partition $a_1$ in FIG. 11), reading of the records written on trials are repeated, the optimum power of the laser beam that can read most appropriately is determined, and the state of use of the OPC area such as the number of times the trial writing has been performed is recorded in the OPC management area (for example, a partition $b_1$ in FIG. 11).

Meanwhile, a recommended recording power value of the laser beam is beforehand recorded in the medium, in general. However, since the optimum power practically varies depending on the medium, it is said to be preferable that the PCA as above is set in each medium to optimize the power of the laser beam each time recording is performed on the medium.

DVD-R (single-sided, single-layer DVD-R), which is representative as well, has a laminated structure in which a dye containing recording layer, a reflective layer and a protective layer covering them are formed in this order on a first transparent disk substrate, and a so-called dummy disk, which is a second disk substrate (which may be transparent or opaque) and a reflective layer formed on the second disk substrate is formed on the protective layer through or not through an adhesive layer. Recording or reading are performed with a laser beam from one side of the disk through the first transparent disk substrate. The dummy disk may be of only a transparent or opaque disk substrate, or may be provided with a layer other than the reflective layer.

Meanwhile, DVD+R has almost the same structure as DVD-R, description of which will be hereinafter represented by DVD-R.

CD-R and DVD-R are optical disks using chemical changes in the dye recording layer, onto which writing is possible only once (that is, rewriting is impossible). On the other hand, CD-RW and DVD-RW are optical disks of the phase-change type using crystalline changes in the recording layer, onto which rewriting can be performed plural times. In such phase-change optical disks, protective layers are formed on and under the recording layer, in general.

In order to largely increase the recording capacity of the optical recording medium, two single-sided DVD-Rs as above are bonded together to form a medium having two recording layers, which is known as a double-sided DVD-R (double-sided, dual-layer DVD-R). Recording or reading are performed by irradiating a laser beam onto each of the recording layers from the both sides (that is, the laser beam is emitted from one side of the medium to perform recording and reading on a recording layer closer to this side, while the laser beam is emitted from the other side of the medium to perform recording or reading on the other recording layer closer to the other side).

Like the CD-R described above, a PCA for the OPC process is set in the known single-sided DVD-R and double-sided DVD-R, as well.

With respect to optical recording media having a plurality of recording layers, there is, in these years, a demand for a single-sided incident type optical recording medium (for example, single-sided incident dual-layer DVD-R) on which recording or reading can be performed on a plurality of recording layers by irradiating a laser beam from one side so as to avoid an increase in size and complexity of the recording/reading apparatus, enable continuous reading from the plural recording layers, and improve the facility.

To meet the above demand, there has been proposed an optical recording medium (DVD-R) as shown in FIG. 12, for example. Namely, there has been proposed a single-sided incident type DVD-R of the dual layer type (single-sided, dual-layered DVD-R) having two recording layers, for example, as the single-sided incident type optical recording medium having the structure below (refer to Japanese Unexamined Patent Publication No. HEI 11-66622).

For example, a single-sided incident type DVD-R of the dual layer type of the laminated type is formed by laminating, on a first light-transmissible substrate 5, a first recording layer 12 made from an organic dye on which information can be optically recorded by irradiating a laser beam for recording, a first reflective layer 13 made of a semi-light-transmissible reflective film that can pass through a part of the laser beam for reading, an intermediate layer 11 that can pass through the laser beam for recording and the laser beam for reading, a second recording layer 12' made from an organic dye on which information can be optically recorded by irradiating the laser beam for recording, a second reflective layer 13' reflecting the laser beam for reading, and a second light-transmissible substrate 5' in this order.

With the above structure, it is possible to record information on both the first recording layer 12 and the second recording layer 12' from one side of the optical recording medium. In reading, it is possible to read out signals from one side of the medium as being an optical recording medium of the so-called dual-layer type.

In the case of an optical recording medium having two recording layers on which information is recorded by irradiating a laser beam from one side, there is possibility that conditions of the recording or reading vary according to each recording layer because the recording on the second recording layer 12' is performed through the first recording layer 12, the semi-light-transmissible reflective layer 13, and so forth.

Particularly, the complex refractive index of the first recording layer 12 is changed according to whether or not information is recorded on the first recording layer 12, and thus the quantity of transmitted light is changed. For this, there is possibility that the optimum recording power to the second recording layer 12' largely varies.

When data is recorded on each recording layer of an optical recording medium (particularly, a single-sided incident type DVD-R of the dual layer type) having a plurality of recording layers, it is necessary to perform the recording at the optimum recording power (optimum power) on each recording layer in order to attain good recording on each recording layer.

When the OPC (Optimum Power control) is performed in an area on the inner peripheral side with respect to the data recording area on each recording layer to obtain the optimum power before the recording is performed on each recording layer, the power of the laser diode (laser power) is controlled to be the optimum power beforehand determined, data is then recorded.

When an electric current is supplied, the laser diode used as the light source of the recording light oscillates a laser power according to the electric current. However, when the laser diode continuously oscillates, the temperature is increased, thus the laser power tends to be decreased even at the same electric current value.

When the temperature rises, the wavelength of the laser beam outputted from the laser diode tends to shift toward the longer wavelength's side. Particularly, CD-R and DVD-R have the maximum absorbed wavelength on the shorter wavelength's side than the wavelength of the laser beam, thus the absorption becomes smaller as the wavelength of the laser beam shifts to the longer wavelength. When the wavelength of the laser beam, which is the recording beam, shifts to the longer wavelength's side, the recording sensitivity deteriorates. Accordingly, a larger laser power is required for stable recording.

Further, the temperature of the laser diode itself changes according to the magnitude of the laser power used for recording, the recording time, the ambient temperature, etc. This causes a change in the laser power.

Even if the electric current value of the laser diode is so set and the laser power is so controlled as to provide the previously-determined optimum power, the laser power actually outputted may change due to a change in temperature of the laser diode, for example, which may make excellent recording difficult.

In the case where data is recorded in one recording layer and data is continuously recorded on the other recording layer, if the data is recorded on the latter recording layer with a laser electric current value corresponding to the optimum power beforehand determined, there is possibility that the data is not recorded or the recording is insufficient because the laser power is insufficient, which brings failure in excellent recording.

Particularly, when data is continuously recorded on plural recording layers, it is impossible to perform the OPC on each of the recording layers immediately before the recording is performed on each of the recording layer. For this reason, there is no other alternative but to use the optimum power determined in the OPC beforehand performed. It is thus impossible to cope with changes in temperature of the laser light source, which obstacles attainment of excellent recording in each recording layer.

DISCLOSURE OF INVENTION

In the light of the above problems, an object of the present invention is to provide an optical recording medium having a plurality of recording layers on which information can be recorded by irradiating a laser beam from one side thereof, and a recording method and a recording apparatus for the optical recording medium which can determine an optimum recording power to each of the recording layers.

The recording method and the recording apparatus for the optical recording medium of this invention are aimed at accurately adjusting the recording power used when data is recorded on each of the layers even when the recording power is changed due to a change in temperature of the laser light source, for example, thereby accomplishing good recording on each of the recording layers.

The optical recording medium according to this invention has a plurality of recording layers on which information can be recorded by irradiating a laser beam from one side thereof, each of the recording layers including and a power calibration area for optimizing the intensity of the laser beam.

It is preferable that the power calibration area is located at the inner peripheral side and/or the outer peripheral side of an information recording area of the recording layer.

The optical recording medium according to this invention has an optical-transmissible first substrate, a first recording layer disposed on the first substrate, on which information can be recorded by irradiating a laser beam from the first substrate's side and a second recording layer disposed on the first recording layer, on which information can be recorded by irradiating the laser beam. Each of the first recording layer and the second recording layer includes a power calibration area for optimizing the intensity of the laser beam.

It is preferable that the power calibration areas of the first recording layer and the second recording layer are located at the inner peripheral side and/or the outer peripheral side of information recording areas of the first recording layer and the second recording layer, respectively.

It is preferable that the power calibration areas of the first recording layer and the second recording layer are set at the inner peripheral side of the information recording areas of the first recording layer and the second recording layer, respectively, and recording of information on the first recording layer and the second recording layer is performed from the inner peripheral side toward the outer peripheral side in the information recording areas.

It is preferable that the power calibration area of the first recording layer is set at one side of the inner peripheral side and the outer peripheral side of the information recording area, whereas the power calibration area of the second recording layer is set at the other side of the information recording area, and recording on the first recording layer and recording on the second recording layer are performed forward opposite directions.

It is preferable that the power calibration area of the second recording layer has an area not covered with the power calibration area of the first recording layer.

It is preferable that a part of the first recording layer overlapping on the power calibration area of the second recording area is in a previously-recorded state.

It is preferable that recording of information on the first recording layer is performed before recording of information on the second recording layer.

It is preferable that a recommended recording power value for each of the recording layers is beforehand recorded.

A recording method for an optical recording medium according to this invention is a recording method for an optical recording medium having a plurality of recording layers, which comprises an OPC recording power setting step of performing an optimum power control (hereinafter referred to as an OPC) before recording on each of the plural recording layers to set an OPC recording power for each of the recording layers.

It is preferable that the recording method according to this invention further comprises an initial recording power setting step of correcting an OPC recording power for another recording layer set at the OPC recording power setting step based on a change in actual recording power relative to an OPC recording power for one recording layer set at the OPC power setting step to set a recording power to be used when recording another recording layer is performed.

It is preferable that a change in actual recording power is estimated on the basis of the temperature of the laser light source at the initial recording power setting step.

It is also preferable that a change in actual recording power is estimated on the basis of the quantity of reflected light from the optical recording medium at the initial recording power setting step.

It is still also preferable that a change in actual recording power is estimated on the basis of the quantity of emitted light from the laser light source at the initial recording power setting step.

It is still also preferable that a change in actual recording power is estimated on the basis of the laser current value set in a running OPC at the initial recording power setting step.

It is still also preferable that a change in actual recording power is estimated on the basis of the time period the laser beam is emitted at the initial recording power setting step.

It is preferable that recording on one recording layer and recording on another recording layer are continuously performed.

It is still preferable that the OPC recording power setting step is beforehand performed on all of the recording layers before recording on the optical recording medium, and the initial recording power setting step is performed after recording on one recording layer before recording on another recording layer.

It is preferable that the OPC is performed on the inner peripheral side and the outer peripheral side of each recording layer at the OPC recording power setting step.

A recording apparatus for an optical recording medium is a recording apparatus for an optical recording medium having a plurality of recording layers, which comprises a control arithmetic unit for performing an optimum power control (hereinafter referred to as an OPC) before recording on each of the plural recording layers to set an OPC recording power for each of the recording layers.

It is preferable that the control arithmetic unit corrects an OPC recording power for another recording layer based on a change in actual recording power relative to an OPC recording power for one recording layer to set a recording power to be used when recording on the latter recording layer is started.

It is preferable that the control arithmetic unit estimates a change in actual recording power on the basis of the temperature of the laser light source.

Alternatively, the control arithmetic unit estimates a change in actual recording power on the basis of the quantity of reflected light from the optical recording medium.

Still alternatively, the control arithmetic unit estimates a change in actual recording power on the basis of the quantity of emitted light from the laser light source.

Still alternatively, the control arithmetic unit estimates a change in actual recording power on the basis of the laser current value set in a running OPC.

Still alternatively, the control arithmetic unit estimates a change in actual recording power on the basis of the time period the laser beam is emitted.

The control arithmetic unit continuously performs recording on one recording layer and recording on another recording layer.

Further, the control arithmetic unit beforehand sets an OPC recording power for each of all the recording layers before recording on the optical recording medium, and sets a recording power to be used at the time of start of recording on the another recording layer after recording on the one recording layer before recording on the another recording layer.

The control arithmetic unit performs the OPC on the inner peripheral side and the outer peripheral side of each of the recording layers.

It is preferable that the present invention is applied to an optical recording medium in which the recording layers are dye containing recording layers.

According to this invention, in an optical recording medium on which information is recorded on a plurality of recording layers by irradiating a laser beam from one side thereof, a power calibration area for optimizing the intensity of the laser beam is set on each of the recording layers so that an optimum recording power for each of the recording layers is determined.

Accordingly, it becomes possible to accurately adjust the recording power to be used when data is recorded on each of the recording layers, thereby to accomplish good recording on each of the layers.

An advantage of the recording method and recording apparatus for the optical recording medium according to this invention is that the recording power to be used at the time of recording of data on each of the recording layers can be accurately adjusted even when the recording power is changed due to, for example, a change in temperature of the laser light source, which allows good recording on each of the recording layer. As a result, when recording is continuously performed on a plurality of recording layers of an optical recording medium having the plural recording layers, for example, it is possible to perform good recording on each of the recording layers.

BEST MODE FOR CARRYING OUT THE INVENTION

Hereinafter, embodiments of the present invention will be described with reference to the drawings.

[A] First Embodiment

A recording method and a recording apparatus for an optical recording medium according to this embodiment can be applied to all optical recording media having a plurality of recording layers.

For example, it is preferable that the recording method and the recording apparatus of this embodiment are used to record data (information) in a single-sided incident type optical recording medium (single-sided incident type DVD), which has a plurality of recording layers, and in which data can be recorded on and read from the recording layers by irradiating a beam (laser beam) from one side thereof.

Particularly, the present invention is more effective when it is applied to an optical recording medium having dye containing recording layers because the recording sensitivity of the dye containing recording layer of, for example, a single-sided incident type DVD-R largely changes due to a change in wavelength of the laser beam.

As the single-sided incident type optical recording media (optical disks), there are single-sided incident type DVD-Rs (single-sided, dual-layer DVD-R; single-sided, dual-layer DVD recordable disk) of the dual-layer type having two dye containing recording layers, for example, which are classified into the laminated type and the bonded type.

[1] Laminated Structures of Optical Recording Media

First, description will be made of optical recording media (dual-layer, single-sided incident-type DVD-Rs of the laminated type) of two types having different laminated structures according to this embodiment.

[1-1] Optical Recoding Medium of Type 1

Figure 1:
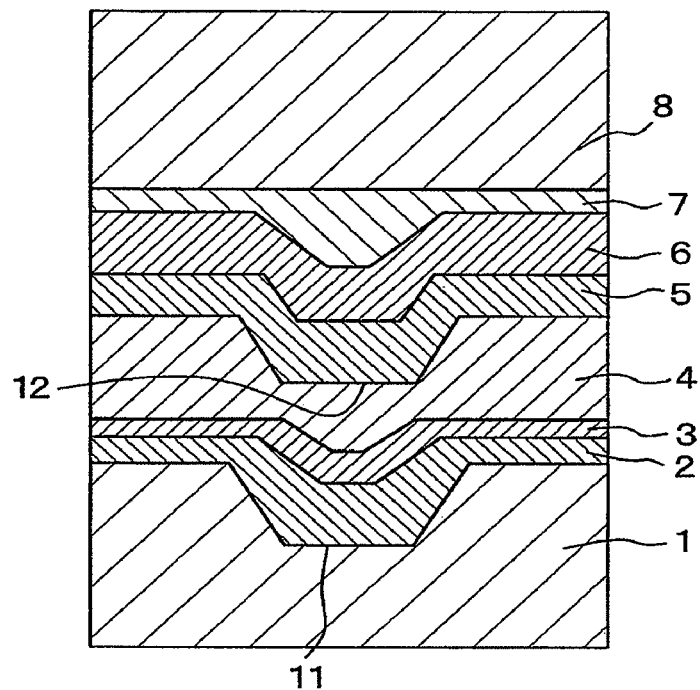
FIG. 1 is a diagram typically showing an optical recording medium (of type 1) according to a first embodiment of this invention.

FIG. 1 is a sectional view of a typical optical recording medium (type 1) according to this embodiment.

The optical recording medium of the type 1 according to this embodiment has, as shown in FIG. 1, a first recording layer (first recording layer, first dye containing recording layer) 2 containing a dye, a semitransparent reflective layer (hereinafter referred to as a semitransparent reflective layer, first reflective layer) 3, an intermediate resin layer (intermediate layer) 4, a second recording layer (second recording layer, second dye containing recording layer) 5 containing a dye, a reflective layer (second reflective layer) 6, an adhesive layer 7 and a second substrate (second substrate) 8 in this order on a disk-shaped transparent (light-transmissible) first substrate (first substrate, first light-transmissible substrate) 1. Optical beams (laser beams) are emitted from the side of the first substrate 1 to perform recording or reading.

In this embodiment, "transparent (light-transmissible)" signifies "transparent (light-transmissible) to optical beams used for recording on or reading from the optical recording medium." Transparent (light-transmissible) layers include a layer which absorbs more or less the optical beams used for recording or reading. For example, when the layer has a transmittance of not less than 50 percent (preferably not less than 60 percent) to the wavelength of an optical beam used for recording or reading, the layer is considered to be light-transmissible (transparent).

Concavities and convexities (lands and grooves) are formed on the transparent first substrate 1 and the intermediate resin layer 4. A recording track is formed with the concavity and/or the convexity. Incidentally, the recording track may be formed with either the concavity or the convexity. Generally, it is often that the recording track 11 on the first substrate 1 is formed with the convexity with respect to the direction of the incident light beam, and the recording track 12 on the intermediate resin layer 4 is formed with the convexity with respect to the direction of the incident light beam, as well. In this invention, the concavity and convexity are defined with respect to the direction of incident light beams used for recording or reading unless not specifically mentioned.

These recording tracks 11 and 12 are made slightly snake in the radial direction at predetermined amplitude and frequency (this called "wobble"). Isolated pits (address pits) are formed according to a certain rule on the land between the recording tracks 11 and 12 (this called "land pre-pits, LPP; Land Pre-Pit). Address information may be beforehand recorded with the land pre-pits. Incidentally, concave or convex pre-pits may be sometimes formed as needed other than the land pre-pits. It is also possible to reverse the direction of the wobble or modulate the frequency, thereby to record information.

Next, each of the layers will be described.

(1) With Respect to First Substrate 1

It is desirable that the first substrate 1 has excellent optical characteristics, that is, the first substrate 1 is transparent, has small birefringence, and so force. It is also desirable that the first substrate 1 has excellent molding properties, that is, the first substrate 1 can be readily formed in injection molding. When the first substrate 1 has small hygroscopicity, such property is desirable because the warping can be decreased.

Further, it is desirable that the first substrate 1 has shape stability so that the optical recording medium has some degree of rigidity. When the second substrate 2 has sufficient shape stability, the first substrate 1 is not required to have large shape stability.

As such material, it is possible to use resins such as acrylic resins, methacrylic resins, polycarbonate resin, polyolefin resins (particularly, amorphous polyolefin), polyester resins, polystyrene resin, epoxy resin, and so forth, and glass. Alternatively, it is possible to provide a resin layer made from a radiation-setting resin such as a photo-setting resin or the like on the substrate made from glass or the like. Incidentally, "radiation" is a general term for light (ultraviolet radiation, visible radiation, infrared ray, etc.), electron beams, and the like.

Meanwhile, polycarbonate is preferable from the viewpoint of optical properties, high productivity such as molding properties and the like, cost, low hygroscopicity, shape stability, etc. From the viewpoint of chemical resistance, low hygroscopicity and the like, amorphous polyolefin is preferable. From the viewpoint of high-speed responsibility and the like, a glass substrate is preferable.

The first substrate 1 is preferably thin. It is preferable that the first substrate 1 has a thickness of not more than 2 mm, more preferably not more than 1 mm. The smaller the distance between the objective lens and the recording layer and the thinner the substrate, the smaller is coma aberrations, which is advantageous to increase the recording density. To obtain sufficient optical properties, hygroscopicity, molding properties and shape stability, some degree of thickness is required. It is thus preferable that the thickness of the first substrate 1 is generally not less than 10 μm, more preferably not less than 30 μm.

In order to well perform recording or reading on both of the first recording layer 2 and the second recording layer 5 in this optical recording medium, it is desirable to suitably adjust the distance between the objective lens and the both recording layers. For example, it is preferable to set the focus of the objective lens at an almost intermediate point between the both recording layers because accesses to the both layers become easy.

More concretely, in a single-sided DVD-R system, the distance between the objective lens and the recording layer is adjusted to be most suitable when the thickness of the substrate is 0.6 mm.

When this layer structure is compatible with a single-sided DVD-R, it is most preferable that the first substrate 1 has a thickness obtained by subtracting a half of the film thickness of the intermediate resin layer 4 from 0.6 mm. If so, the approximately intermediate point between the both layers is approximately 0.6 mm, thus the focusing servo control can be readily performed on the both recording layers.

When another layer such as a buffer layer, a protective layer or the like exists between the second recording layer 5 and the semitransparent reflective layer 3, it is most preferable that the first substrate 1 has a thickness obtained by subtracting a half of a sum of the thicknesses of that layer and the intermediate resin layer 4 from 0.6 mm.

Concavities and convexities are formed spirally or concentrically on the first substrate 1 to form grooves and lands. Generally, with such grooves and lands as being recording tracks, information is recorded on or read from the first recording layer 2. In the case of a so-called DVD disk on which recording or reading are performed by condensing a laser beam having a wavelength of 650 nm with an objective lens having a numerical aperture of 0.6 to 0.65, the first recording layer 2 is generally formed in coating, so that the film of the second recording layer 2 is thick at the grooves, which is suitable for recording or reading.

In this optical recording medium, it is preferable that the groove of the first substrate 1, that is, the convexity with respect to the direction of the incident light beam, is used as the recording track 11. Here, the concavity and the convexity are portions recessed and projecting in relation with the direction of the incident light beam. Generally, the width of the groove is about 50 to 500 nm, and the depth of the groove is about 10 to 250 nm. When the recording track is spiral, the track pitch is preferably about 0.1 to 2.0 μm. The first substrate 1 may have concave or convex pits such as land pre-pits or the like as required.

From the viewpoint of cost, it is preferable to manufacture the substrate having such concavities and convexities in injection molding from a stamper having concavities and convexities. When a resin layer made of a radiation-setting resin such as a photo-setting resin or the like is formed on the substrate made from glass or the like, a concavity or a convexity such as a recording track or the like may be formed on the resin layer.

(2) With Respect to First Recording Layer 2

Generally, the sensitivity of the first recording layer 2 is almost equivalent to that of the recording layer used in a single-sided recording medium (for example, CD-R, DVD-R, DVD+R) or the like.

In order to realize a good recording/reading performance, it is preferable that the first recording layer 2 contains a low-exothermatic dye having high refractive index.

Further, a combination of the first recording layer 2 and the semitransparent reflective layer 3 is preferably within appropriate ranges of the reflection, transmission and absorption of light, whereby the recording sensitivity is improved and the thermal interference at the time of recording is decreased.

As such organic dye material, there are macrocyclic azaannulene type dyes (phtalocyanine dye, naphtalocyanine dye, porphyrin dye, etc.), pyrromethene type dyes, polymethine type dyes (cyanine dye, merocyanine dye, squalirium dye, etc.) anthoraquinone type dyes, azulenium type dyes, metal complex azo type dyes, metal complex indoaniline type dyes, etc.

Among the above various organic dyes, metal complex azo type dyes are preferable because they have excellent recording sensitivity, durability and light resistance. Particularly, a compound represented by the following general formula (I) or (II) is preferable:

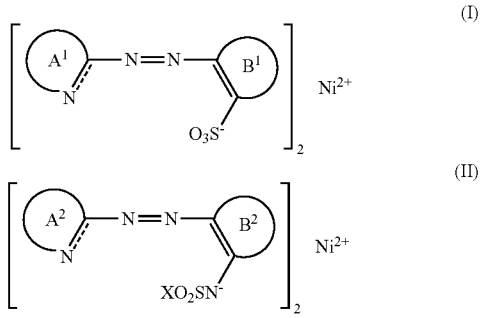

(where rings $A^1$ and $A^2$ are nitrogen-containing aromatic heterocycles, each of which can independently have a substituent; rings $B^1$ and $B^2$ are aromatic rings, each of which can independently have a substituent; and X is an alkyl group having carbon number 1 to 6 substituted with at least two fluorine atoms). An organic dye used in the recording layer (incidentally, "recording layer" hereinafter signifying both the first recording layer 1 and the second recording layer 2 unless specifically mentioned) of this optical recording medium preferably has the maximum absorption wavelength λmax within a range from the visible rays to the near infrared rays of approximately 350 to 900 nm, and is a dye compound suited to recording with a laser of blue to near microwave. More preferable is a dye suited to recording with a near infrared laser (typically at 780 nm, 830 nm, etc.) used generally for CD-R, a red laser (typically at 635 nm, 650 nm, 680 nm, etc.) at about a wavelength of 620 to 690 nm used for DVD-R, or a so-called blue laser at a wavelength of 410 nm or 515 nm.

It is possible to use one kind of dye, or mix two or more the same or different kinds of dyes and use them. Further, it is possible to use together dyes suited for recording with a recording beam at a plurality of wavelengths to realize an optical recording medium coping with recording with a laser beam in a plurality of wavelength bands.

The recording layer may contain a transition metal chelate compound (for example, acetylacetonato chelate, bisphenyldithiol, salicylaldehyde oxime, bisdithio-α-diketone or the like) as a singlet oxygen quencher in order to stabilize the recording layer or improve the light resistance, or a recording sensitivity improving agent such as a metal system compound or the like in order to improve the recording sensitivity. Here, the metal system compound is that a metal such as a transition metal or the like in the form of atom, ion, cluster or the like is contained in a compound. As such metal system compound, there are, for example, organometallic compounds such as ethylenediamine complexes, azomethine complexes, phenylhydroxyamine complexes, phenanthroline complexes, dihydroxyazobenzene complexes, dioxime complexes, nitrosoaminophenol complexes, phyridyltriazine complexes, acetylacetonato complexes, metallocene complexes, porphyrin complexes, and the like. There is no limitation with respect to the metal atom, but a transition metal is preferable.

Further, a binder, a leveling agent, an antiforming agent and the like may be together used to make the recording layer of this optical recording medium as required. As a preferable binder, there are poly(vinyl alcohol), poly(vinyl pyrrolidone), nitrocellulose, cellulose acetate, ketone resins, acrylic resins, polystyrene resins, urethane resins, poly(vinyl butyral), polycarbonate, polyolefin, etc.

The film thickness of the recording layer is not specifically limited because the suited film thickness differs according to the recording method or the like. However, in order to obtain sufficient modulation amplitude, the film thickness is preferably not less than 5 nm, more preferably not less than 10 nm, and specifically preferably not less than 20 nm, in general. However, the recording layer is required not to be excessively thick in order to appropriately pass through the light in this optical recording medium. Accordingly, the film thickness of the recording layer is generally not larger than 3 μm, preferably not larger than 1 μm, and more preferably not larger than 200 nm. The film thickness of the recording layer differs from the groove to the land. In this optical recording medium, the film thickness of the recording layer is at the groove of the substrate.

As the method of deposition of the recording layer, there can be applied a thin film deposition generally performed such as vacuum evaporation, sputtering method, doctor blade method, cast method, spin coating, dipping method or the like. From the standpoint of productivity and cost, spin coating is preferable. Vacuum evaporation is more preferable than coating method because it can yield a recording layer having even thickness.

When the deposition is performed in spin coating, the rotation speed is preferably 10 to 15000 rpm. After the spin coating, a process of heating or applying solvent vapor or the like may be performed.

As a coating solvent used when the recording layer is formed in a coating method such as doctor blade method, cast method, spin coating, dipping method or the like, the type of solvent is not limited, thus any solvent can be used so long as it does not attack the substrate. For example, there are ketone alcohol type solvents such as diaceton alcohol, 3-hydroxy-3-methyl-2-butanone and the like, cellosolve type solvents such as methyl cellosolve, ethyl cellosolve and the like, chain hydrocarbon type solvents such as n-hexane, n-octane and the like, ring hydrocarbon type solvents such as cyclohexane, methylcyclohexane, ethylcyclohexane, dimethylcyclohexane, n-butylcyclohexane, tert-butylcyclohexane, cyclooctane and the like, perfluoroalkylalcohol type solvents such as tetrafluoropropanol, octafluoropentanol, hexafluorobutanol and the like, hydroxy carboxylic acid ester type solvents such as methyl lactate, ethyl lactate, methyl 2-hydroxyisobutyric acid and the like, etc.

In the case of vacuum evaporation, an organic dye is put in a crucible disposed inside a vacuum chamber, along with recording layer components such as various additives and the like as required, for example, the inside of the vacuum chamber is evacuated to about $10^{-2}$ to $10^{-5}$ Pa by an appropriate vacuum pump, after that, the crucible is heated to vaporize the recording layer components, and the recording layer components are deposited on the substrate placed opposite to the crucible, whereby the recording layer is formed.

(3) With Respect to Semitransparent Reflective Layer 3

The semitransparent reflective layer 3 is a reflective layer having some degree of light transmittance. Namely, the semitransparent reflective layer 3 is a reflective layer which has small light absorption, a light transmittance of not less than 40 percent, and appropriate light reflectance (of not less than 30 percent, in general). For example, by providing a thin metal film having high reflectance, it is possible to give appropriate transmittance. It is desirable that the semitransparent reflective layer 3 have some degree of corrosion resistance. Further, it is desirable that the semitransparent reflective layer 3 has shutting-off properties so that the first recording layer 2 is not affected by leaking of the upper layer (here the intermediate resin layer 4) of the semitransparent reflective layer 3.

To secure high transmittance, the thickness of the semitransparent reflective layer 3 is preferably not larger than 50 nm, in general. The thickness of the semitransparent reflective layer 3 is more preferably not larger than 30 nm, and still more preferably not larger than 20 nm. However, the semitransparent reflective layer 3 is required to be thick to some degree in order to avoid an effect of the upper layer of the semitransparent reflective layer 3 on the first recording layer 2. Thus, the thickness of the semitransparent reflective layer 3 is generally not less than 3 nm, and more preferably not less than 5 nm.

As the material of the semitransparent reflective layer 3, it is possible to use, solely or in the form of alloy, metals and semimetals such as Au, Al, Ag, Cu, Ti, Cr, Ni, Pt, Ta, Pd, Mg, Se, Hf, V, Nb, Ru, W, Mn, Re, Fe, Co, Rh, Ir, Zn, Cd, Ga, In, Si, Ge, Te, Pb, Po, Sn, Bi and rare earth metals, which have appropriately high reflectance at the wavelength of the reading beam. Among them, Au, Al and Ag have high reflectance, thus are suitable as the material of the semitransparent reflective layer 3. The semitransparent reflective layer 3 may contain other component other than the above as being the main component.

A material containing Ag as the main component is particularly preferable because of its low cost and high reflectance. Here, the main component signifies a material contained not less than 50 percent.

Since the semitransparent reflective layer 3 has thin film thickness, large crystal grains of the film cause reproduction noise. Thus, it is preferable to use a material having small crystal grains. Since pure silver tends to have large crystal grains, it is preferable to use Ag as in the form of alloy.

Particularly, it is preferable to contain Ag as the main component, and 0.1 to 15 atomic percent of at least one element selected from the group consisting of Ti, Zn, Cu, Pd, Au and rare earth metals. When two or more of Ti, Zn, Cu, Pd, Au and rare earth metals are contained, each of these may be 0.1 to 15 atomic percent. However, the sum of these is preferably 0.1 to 15 atomic percent.

A particularly preferable alloy composition is one that contains Ag as the main component, 0.1 to 15 atomic percent of at least one element selected from the group consisting of Ti, Zn, Cu, Pd and Au, and 0.1 to 15 atomic percent of at least one rare earth element. Among the rare earth metals, neodymium is particularly preferable. In more concrete, AgPdCu, AgCuAu, AgCuAuNd, AgCuNd, etc. are preferable.

As the semitransparent reflective layer 3, a layer made from only Au is preferable because it has small crystal grains and corrosion resistance, but it is more expensive than an Ag alloy.

Alternatively, it is possible to use a layer made from Si as the semitransparent reflective layer 3.

It is possible to stack, one on the other, a thin film having low reflectance and a thin film having high reflectance both made from materials other than metals to form multi-layers, and use them as the reflective layer.

As a method for forming the semitransparent reflective layer 3, there can be applied, for example, sputtering, ion plating, chemical evaporation, vacuum evaporation, etc. It is possible to provide an inorganic or organic intermediate layer and an adhesive layer between the first substrate 1 and the first recording layer 2, and/or, the first recording layer 2 and the semitransparent reflective layer 3 in order to improve the reflectance, the recording performance and the adhesive properties. For example, it is possible that an intermediate layer (or an adhesive layer), the first recording layer 2, and an intermediate layer (or the adhesive layer) and the semitransparent reflective layer 3 are stacked in this order on the first substrate 1 to provide the intermediate layer (or the adhesive layer) between the first substrate 1 and the first recording layer 2, and to provide the intermediate layer (or the adhesive layer) between the first recording layer 2 and the semitransparent reflective layer 3.

(4) With Respect to Intermediate Resin Layer 4

The intermediate resin layer (resin layer) 4 is required to be transparent, and to allow grooves and pits to be formed thereon with concavities and convexities. It is preferable that the intermediate resin layer 4 has strong adhesion, and small shrinkage factor at the time that the intermediate resin layer 4 hardens and adheres, which gives stability to the shape of the medium.

It is desirable that the intermediate resin layer 4 is made from a material that does not damage the second recording layer 5. The intermediate resin layer 4 is easily compatible with the second recording layer 5 because the intermediate resin layer 4 is generally made from a resin. For this, it is desirable to provide a buffer layer to be described later between the intermediate resin layer 4 and the second recording layer 5 in order to prevent the intermediate resin layer 4 from dissolving the second recording layer 5 and from giving damage thereto.

Further, it is desirable that the intermediate resin layer 4 is made from a material that does not damage the semitransparent reflective layer 3. It is possible to provide a buffer layer to be described later between the both layers in order to avoid the damage.

In this optical recording medium, it is preferable to accurately control the film thickness of the intermediate resin layer 4. The film thickness of the intermediate resin layer 4 is preferably not less than 5 µm, in general. It is necessary to provide a certain degree of distance between the two recording layers in order to perform the focusing servo control separately on the two recording layers. The film thickness of the intermediate resin layer 4 is required to be generally not less than 5 µm, and preferably not less than 10 µm although it depends on the focusing servo mechanism. Generally, the distance between the two recording layers can be smaller as the objective lens has a larger numerical aperture. However, when the intermediate resin layer 4 is excessively thick, it takes a long time to adjust the focusing servo to the two recording layers and the objective lens has to be moved for a long distance, which is thus undesirable. Further, an excessively thick layer requires a long time to harden, which leads to a decrease in productivity. Accordingly, the film thickness of the intermediate resin layer 5 is preferably not larger than 100 µm.

Spiral or concentric concavities and convexities are formed on the intermediate resin layer 4 to form grooves and lands. Generally, such grooves and lands are used as recording tracks to record or read information in or from the second recording layer 5. Since the second recording layer 5 is formed in coating, the film thereof is thick at the groove, thus suits for recording or reading. In this optical recording medium, it is preferable to use the groove of the intermediate resin layer 4, that is, the convex portion to the direction of the incident light beam, as the recording track 12. Here, the concave portion and the convex portion are a concave portion and a convex portion with respect to the direction of the incident light beam. Generally, the width of the groove is about 50 to 500 nm, and the depth of the same is about 10 to 250 nm. When the recording track is spiral, the track pitch is preferably about 0.1 to 2.0 μm. Concave or convex pits such as land pre-pits may be formed as required.

It is preferable from the viewpoint of the cost that such concavities and convexities are manufactured by transferring the concavities and convexities from a resin stamper or the like having the concavities and convexities to a setting resin such as a photo-setting resin, and hardening the resin. Hereinafter, such method will be occasionally referred to as 2P method (Photo Polymerization method).

As the material of the intermediate resin layer 4, available are radiation setting resins such as thermoplastic resins, thermosetting resins, electron beam setting resins, ultraviolet ray-curable resins (including retarded-curable type), etc., for example. Incidentally, "radiation" is a general term for light (ultraviolet rays, visible rays, infrared rays, etc.), electron beams, and so forth.

The intermediate resin layer 4 can be formed by dissolving a thermoplastic resin, thermosetting resin or the like in an appropriate solvent to prepare a coating liquid, applying the liquid, and drying (annealing) the liquid. In the case of a ultraviolet curable resin, the intermediate resin layer 4 can be formed by dissolving the resin as it is or dissolving the resin in an appropriate solvent to prepare a coating liquid, coating the coating liquid, and radiating ultraviolet rays to cure the resin. There are various types of ultraviolet ray-curable resins. However, any one of them can be used so long as it is transparent. One of these materials can be used or some of them can be mixed together to be used. Not only single layer but also multiple layers are applicable.

As the coating method, a coating method such as spin coating, cast method or the like is applicable, like the recording layer. Among them, spin coating is preferable. A resin having high viscosity can be coated in screen printing or the like. Use of a ultraviolet ray-curable resin that liquidizes at a temperature of 20 to 40° C. is preferable because no solvent is necessary to coat the resin. It is preferable to prepare the resin so that the viscosity thereof is 20 to 4000 mPa·s.

As the ultraviolet ray-curable adhesives, there are radical type ultraviolet ray-curable adhesives and cation type ultraviolet ray-curable adhesives, both of which are usable.

As the radical type ultraviolet setting adhesives, all the known compositions are available. A composition containing an ultraviolet ray-curable compound and a photopolymerization initiator as essential ingredients is used. As the ultraviolet ray-curable compound, monofunctional (meta)acrylate or multifunctional (meta)acrylate is available as a polymeric monomer ingredient. These can be used solely, or two or more kinds of them can be used together. In this invention, acrylate and metaacrylate will be together referred to as (meta)acrylate.

For example, the followings are the polymeric monomers that can be used for this optical recording medium. As monofunctional (meta)acrylate, there is, for example, (meta)acrylate or the like having, as the substituent, a group of methyl, ethyl, propyl, butyl, amyl, 2-ethylhexyl, octyl, nonyl, dodecyl, hexadecyl, octadecyl, cyclohexyl, benzyl, methoxyethyl, butoxyethyl, phenoxyethyl, nonylphenoxyethyl, tetrahydrofurfuryl, glycidyl, 2-hydroxyethyl, 2-hydroxypropyl, 3-chloro-2-hydroxypropyl, dimethylaminoethyl, diethylaminoethyl, nonylphenoxyethyltetrahydrofurfuryl, caprolactone denaturated tetrahydrofurfuryl, isobornyl, dicyclopentanyl, dicyclopentenyl, dicyclopentenyloxyethyl, or the like.

As the multifunctional (meta)acrylates, there are di(meta)acrylates of 1,3-butylenegycol, 1,4-butanediol, 1,5-pentanediol, 3-methyl-1,5-pentanediol, 1,6-hexanediol, neopentyl glycol, 1,8-octanediol, 1,9-nonanediol, tricyrodecandimethanol, ethylene glycol, polyethylene glycol, propylene glycol, dipropylene glycol, tripropylene glycol, polypropylene glycol and the like, di(meta)acrylate of tris(2-hydroxyethyl)isocyanurate, di(meta)acrylate of diole obtained by adding 4 or more moles of ethylene oxide or propylene oxide to 1 mole of neopentyl glycol, di(meta)acrylate of diole obtained by 2 moles of ethylene oxide or propylene oxide to 1 mole of bisphenol A, di or tri(meta)acrylate of triol obtained by adding 3 or more moles of ethylene oxide or propylene oxide to trimethylolpropane, di(meta)acrylate of diol obtained by adding 4 or more moles of ethylene oxide or propylene oxide to 1 mole of bisphenol A, trimethylolpropanetri(meta)acrylate, pentaerythritoltri(meta)acrylate, poly(meta)acrylate of dipentaerythritol, ethylene oxide denaturated phospholic acid (meta)acrylate, ethylene oxide denaturated alkylated phospholic acid (meta)acrylate, etc.

One that can be used together with polymetic polymer is polyester(meta)acrylate, polyether(meta)acrylate, epoxy (meta)acrylate, urethane(meta)acrylate or the like, as polymeric oligomer.

As a photopolimerization initiator used for this optical recording medium, any one of the known initiators that can harden a used ultraviolet ray-curable compound represented by polymeric oligomer and/or polymeric monomer can be used. As the optical polymerization initiator, the molecular fission type or the hydrogen abstraction type is suitable.

As such photopolymerization initiator, suitably used are bensoin isobutyl ether, 2,4-diethylthioxanthone, 2-isoproplythioxanthone, benzyl, 2,4,6-trimethylbenzoyldiphenylphosphineoxide, 2-benzyl-2-dimethylamino-1-(4-morpholinophenyl)-butane-1-one, bis(2,6-dimethoxybenzoyl)-2,4,4-trimethylpenthylphosphinoxide, etc. As the molecular fission type other than these, 1-hydroxycyclohexylphenylketone, benzomethylether, benzyldimethylketal, 2-hydroxy-2-methyl-1-phenylpropane-1-one, 1-(4-isopropylphenyl)-2-hydroxy-2-methylpropane-1-one, 2-methyl-1-(4-methylthiophenyl)-2-morphorinopropane-1-one, and the like can be together used. Further, benzophenone, 4-phenylbenzophenon, isophthalphenone, 4-benzoyl-4'-methyl-diphenyl-sulfide or the like, which are photopolimerization initiator of the molecular abstraction type, can be together used.

As the sensitizer to the photopolymerization initiator, amine that does not cause the addition reaction with the above polymeric component, such as trimethylamine, methyldimethanolamine, triethanolamine, p-diethylaminoacetophenone, p-dimethylaminoethylbenzoate, p-dimethylaminoisoamylbenzoate, N,N-dimethylbenzylamine, 4,4'-bis(diethylamino)benzophenone or the like. It is preferable to select and use one of the above photopolymerization initiators and sensitizers which has excellent solubility to the ultraviolet ray-curable compound and does not hinder the ultraviolet ray transmissivity.

As the cation type ultraviolet ray-curable adhesive, all the known compositions can be used. Epoxy resins containing a photopolimerization initiator of the cation polymerization type correspond to this. As photo initiators of the cation polymerization type, there are sulfonium salts, iodonium salts, diazonium salts, etc.

As examples of iodonium salts, there are diphenyliodonium hexafluorophosphate, diphenyliodonium hexafluoroantimonate, diphenyliodonium tetrafluoroborate, diphenyliodonium tetrakis(pentafluorophenyl) borate, bis(dodecylphenyl)iodonium hexafluorophosphate, bis(dodecylphenyl)iodonium hexafluoroantimonate, bis(dodecyl)iodonium tetrafluoro borate, bis(dodecylphenyl) iodonium tetrakis(pentafluorophenyl)borate, 4-methylphenyl-4-(1-methylethyl)phenyliodonium hexafluorophosphate, 4-methylphenyl-4-(1-methylethyl)

phenyliodonium hexafluoroantimonate, 4-methylphenyl-4-(1-methylethyl)phenyliodonium tetrafluoroborate, 4-methylphenyl-4-(1-methylethyl)phenyliodonium tetrakis (penthafluorophenyl)borate, etc.

As the epoxy resin, any one of bisphenol A-epichlorohydrin type, alicylic epoxy, long-chain aliphatic type, brominated epoxy resin, glycidyl ester type, glycidyl ether type, heterocyclic system, etc. is available.

As the epoxy resin, it is preferable to use one that has small contents of liberated free chlorine and chlorine ions in order to avoid the resin from damaging the reflective layer. The quantity of chlorine is preferably not larger than 1 wt %, and more preferably not larger than 0.5 wt %.

A rate of the cation polymerization type photo-initiator to 100 parts by weight of the cation type ultraviolet ray-curable resin is generally 0.1 to 20 parts by weight, and preferably 0.2 to 5 parts by weight. In order to use more effectively the wavelengths in the near infrared ray region or the visible radiation region in the wavelength band of the ultraviolet ray source, it is possible to use together a known optical sensitizer. As such optical sensitizer, there are anthracene, phenotiazine, benzylmethylketal, benzophenone, acetophenone, etc.

In order to improve various properties of the ultraviolet ray-curable adhesive, it is possible to add, as other additives, a thermal polymerization inhibitor, an antioxidant represented by hindered phenol, hindered amine, phosphite, etc., a plasticizer, a silane coupling agent represented by epoxysilane, mercaptosilane, (meta)acrylsilane, etc., as required. Among them, one that has excellent solubility to the ultraviolet ray-curable compound and does not hinder the ultraviolet ray transmissiveness is selected and used.

(5) With Respect to Second Recording Layer 5

The second recording layer 5 generally has higher sensitivity than a recording layer used for a single-sided recording medium (for example, CD-R, DVD-R, DVD+R) and the like. In this optical recording medium, since the power of an incident optical beam is divided by the presence of the semitransparent reflective layer 3 or the like, and distributed for recording in the first recording layer 2 and the recording in the second recording layer 5, recording is performed with a half of the power. Accordingly, the second recording layer 5 is required to have specifically high sensitivity.

For the purpose of realization of excellent recording/reading performance, it is desirable that the dye develops a little heat and has large refractive index.

Further, it is desirable that a combination of the second recording layer 5 and the reflective layer 6 provides appropriate ranges of reflection and absorption of the light. Whereby, the recording sensitivity can be increased and the thermal interference at the time of recording can be diminished.

The materials and deposition method of the second recording layer 5 are almost the same as the first recording layer 2, thus only the differences between them will be hereinafter described.

The film thickness of the second recording layer 5 is not specifically limited because the suitable film thickness differs according to the recording method, etc. In order to obtain sufficient modulation amplitude, the film thickness of the second recording layer 5 is preferably not less than 10 nm in general, more preferably not less than 30 nm, and particularly preferably not less than 50 nm. However, the film is required not to be excessively thick in order to obtain appropriate reflectance, the film thickness is generally not larger than 3 μm, preferably not larger than 1 μm, and more preferably not larger than 200 nm.

The materials used for the first recording layer 2 and the second recording layer 5 may be the same or may differ from each other.

(6) With Respect to Reflective Layer 6

The reflective layer 6 is required to have high reflectance. It is desirable that the reflective layer 6 is highly durable.

In order to secure high reflectance, the thickness of the reflective layer 6 is preferably not less than 20 nm, in general, more preferably not less than 30 nm, and further preferably not less than 50 nm. In order to shorten the tact time of the production and decrease the cost, it is preferable that the reflective layer 6 is thin to some degree. Accordingly, the film thickness is generally not larger than 400 nm, and more preferably not larger than 300 nm.

As the material of the reflective layer 6, it is possible to use, solely or in a form of alloy, metals having sufficiently high reflectance at a wavelength of the reading light such as Au, Al, Ag, Cu, Ti, Cr, Ni, Pt, Ta and Pd, for example. Among them, Au, Al and Ag are suitable for the material of the reflective layer 6 because they have high reflectance. Other than these as the main compositions, the reflective layer 6 may contain the followings as other components. As examples of the other components, there are metals such as Mg, Se, Hf, V, Nb, Ru, W, Mn, Re, Fe, Co, Rh, Ir, Cu, Zn, Cd, Ga, In, Si, Ge, Te, Pb, Po, Sn, Bi and rare earth metals, and semimetals.

A film containing Ag as the main component is particularly preferable because the cost thereof is low, it provides high reflectance and a beautiful white ground color when a print accepting layer to be described later is further provided. Here, "main component" signifies a component whose rate of content is not less than 50 percent.

In order to secure high durability (high corrosion resistivity) of the reflective layer 6, it is preferable to use Ag in the form of alloy rather than as pure silver.

Among the alloys, an alloy that contains Ag as the main component and contains 0.1 to 15 atomic percent of at least one element selected from the group consisting of Ti, Zn, Cu, Pd, Au and rare earth metals is preferable. When the alloy contains two or more of Ti, Zn, Cu, Pd, Au and rare earth metals, each of them may be contained 0.1 to 15 atomic percent. However, it is preferable that the sum of these is 0.1 to 15 atomic percent.

A particularly preferable composition of the alloy is that Ag is contained as the main component, 0.1 to 15 atomic percent of at least one element selected from the group consisting of Ti, Zn, Cu, Pd and Au is contained, and 0.1 to 15 atomic percent of at least one rear earth element is contained. Among rare earth elements, neodymium is particularly preferable. More concretely, AgPdCu, AgCuAu, AgCuAuNd, AgCuNd or the like is preferable.

As the reflective layer 6, a layer made from only Au is preferable because its high durability (high corrosion resistance), but is more expensive than a layer made from only an Ag alloy.

It is possible to stack a thin film having low reflective index and a thin film having high reflective index, both of which are made from materials other than metals, one on the other to form a multilayer, and use it as the reflective layer 6.

As a method for forming the reflective layer 6, there are, for example, spattering, ion plating, chemical vapor deposition, vacuum evaporation, etc. It is possible to provide a known inorganic or organic intermediate layer or an adhesive layer on the upper surface and the lower surface of the reflective layer 6 in order to improve the reflectance, recording performance, adhesive properties and so forth.

(7) With Respect to Adhesive Layer 7

The adhesive layer 7 is not required to be transparent. High adhesion and small shrinkage of the adhesive layer 7 at the time that the layer is hardened and adhered brings stability of the shape of the medium, which is preferable.

It is preferable that the adhesive layer 7 is made from a material that does not damage the reflective layer 6. It is possible to provide a known inorganic or organic protective layer between the both layers in order to avoid the damage on the reflective layer 6.

In this optical recording medium, the film thickness of the adhesive layer 7 is preferably not less than 2 µm, in general. In order to obtain predetermined adhesion, some degree of film thickness is required. More preferably, the film thickness of the adhesive layer 7 is not less than 5 µm. Generally, it is preferable that the film thickness of the adhesive layer 7 is not larger than 100 µm in order to make the optical recording medium thin as much as possible. This is why a thick film requires a longer time to be hardened, which leads to a decrease in the productivity.

The material of the adhesive layer 7 may be the same as the material of the intermediate resin layer 4, or may be a pressure sensitive double-sided tape or the like. By putting the pressure sensitive double-sided tape between the reflective layer 6 and the second substrate 8 and pressing them, the adhesive layer 7 can be formed.

(8) With Respect to Second Substrate 8

It is preferable that the second substrate 8 has shape stability so that the optical recording medium has some degree of rigidity. Namely, it is preferable that the second substrate 8 has high mechanical stability and large rigidity. It is also preferable that the second substrate 8 has large adhesion to the adhesive layer 7.

When the first substrate 1 does not have sufficient shape stability as above, the second substrate 8 is particularly required to have large shape stability. In this viewpoint, it is preferable that the second substrate 8 has low moisture absorption. The second substrate 8 is not required to be transparent. The second substrate 8 may be a mirror substrate, and is not required to have concavities and convexities thereon. Thus, the second substrate 8 is not always required to have good transfer property in injection molding.

As such material, the same material as that used for the first substrate 1 can be used. Other than this, there can be used an Al alloy substrate containing Al as the main component such as an Al—Mg alloy or the like, an Mg alloy substrate containing Mg as the main component such as an Mg—Zn alloy or the like, a substrate made from any one of silicon, titanium and ceramics, or a substrate made by combining them.

In the viewpoint of high productivity such as molding property and the like, cost, low moisture absorption, shape stability, etc., polycarbonate is preferable. In the viewpoint of chemical resistance, low moisture absorption, etc., amorphous polyolefin is preferable. In the viewpoint of high-speed responsibility, etc., a glass substrate is preferable.

In order to give sufficient rigidity to the optical recording medium, it is preferable that the second substrate 8 is thick to some degree, having a thickness of not less than 0.3 mm. However, since a thinner second substrate 8 is more advantageous to make the recording/reading apparatus thinner, the thickness of the second substrate 8 is preferably not larger than 3 mm, and more preferably not larger than 1.5 mm.

The second substrate 8 may be a mirror substrate not having concavities and convexities thereon. From the standpoint of easy production, it is preferable that the second substrate 8 is manufactured in injection molding.

An example of a preferable combination of the first substrate 1 and the second substrate 8 is that the first substrate 1 and the second substrate 8 are made from the same material, and have the same thickness. By doing so, the rigidity of the first substrate 1 and the second substrate 8 are equivalent, which gives good balance. Whereby, the medium is prone not deform due to changes in environment, which is preferable. In which case, it is preferable that the degrees and directions of deformation of the both substrates brought when the environments change are in harmony.

As another preferable example of the combination, the first substrate 1 is as thin as about 0.1 mm, whereas the second substrate 8 is as thick as about 1.1 mm. By doing so, the objective lens can easily approach the recording layer, whereby the recoding density is easily increased. Accordingly, this is preferable. In this case, the first substrate 1 may be in sheet-like shape.

(9) With Respect to Other Layers

In this layered structure, another layer may be arbitrarily put in the layers as required. Alternatively, it is possible to arbitrarily provide another layer on the outermost surface of the medium. In concrete, it is possible to provide a buffer layer as an intermediate layer between the semitransparent reflective layer 3 and the intermediate resin layer 4, the intermediate resin layer 4 and the second recording layer 5, or the reflective layer 6 and the adhesive layer 7, for example.

The buffer layer is to prevent two layers from dissolving in each other and prevent the two layers from blending to each other. The buffer layer may have another function than the function of preventing the dissolving phenomenon. Further, still another intermediate layer may be put as required.

The material of the buffer layer is required to be immiscible with the second recording layer 5 or the intermediate resin layer 4, and be optically transmittable to some degree. The known inorganic or organic material can be used for the buffer layer. In the viewpoint of the properties, an organic material is preferably used. For example, (1) metal or semiconductor, (2) oxide, nitride, sulfide, trisulfide, fluoride or carbide of metal or semiconductor, and (3) amorphous carbon or the like are available. Among these, a layer made from an almost transparent dielectric substance, or a very thin metal layer (including alloy) is preferable.

In concrete, oxides such as silicon oxide, particularly, silicon dioxide, zinc oxide, cerium oxide, yttrium oxide and the like; sulfides such as zinc sulfide, yttrium sulfide and the like; nitrides such as silicon nitride and the like; silicon carbide; a mixture (trisulfide) of an oxide and sulfur; and alloys to be described later are preferable. A mixture of silicon oxide and zinc sulfide at a ratio of approximately 30:70 to 90:10 (weight ratio) is preferable. A mixture ($Y_2O_2S$—ZnO) of sulfur, yttrium dioxide and zinc oxide is also preferable.

As the metal or alloy, silver or an alloy that contains silver as the main component and 0.1 to 15 atomic percent of at least one element selected from the group consisting of titanium, zinc, copper, palladium and gold is preferable. An alloy that contains silver as the main component and 0.1 to 15 atomic percent of at least one rare earth element is preferable, as well. As the rare earth element, neodymium, praseodymium, cerium or the like is preferable.

Alternatively, any resin layer can be used so long as it does not solve the dye in the recording layer when the buffer layer is made. Particularly, a polymer film which can be manufactured in vacuum evaporation or CVD method is useful.

The thickness of the buffer layer is preferably not less than 2 nm, and more preferably not less than 5 nm. When the buffer layer is excessively thin, prevention of the above mixing phenomenon tends to be insufficient. The thickness of the buffer layer is preferably not larger than 2000 nm, and more preferably not larger than 500 nm. Excessive thick buffer layer is not only necessary for prevention of the mixing but also may cause a decrease in the optical transmission. When the layer is made from an inorganic substance, the film deposition of the layer takes a longer time, which causes a decrease in productivity, or the film stress is increased. Thus, the film thickness is preferably not larger than 200 nm. Particularly, since a film made from a metal excessively deteriorates the optical transmittance, the film thickness is preferably not larger than approximately 20 nm.

A protective layer may be provided in order to protect the recording layer or the reflective layer. The material of the protective layer is not specifically limited but any material is available so long as it protects the recording layer or the reflective layer from the external force. As an organic material of the protective layer, there are a thermal plastic resin, a thermal setting resin, an electron beam setting resin, a ultraviolet ray-curable resin and the like. As an organic material of the protective layer, there are silicon oxide, silicon nitride, $MgF_2$, $SnO_2$ and the like.

The protective layer can be formed by dissolving a thermal plastic resin, a thermal setting resin or the like in an appropriate solvent to prepare a coating liquid, and applying and drying the liquid. In the case of a ultraviolet ray-curable resin, the protective layer can be formed by preparing a coating liquid of the ultraviolet ray-curable resin itself or a coating liquid obtained by dissolving the ultraviolet ray-curable resin in an appropriate solvent, applying the coating liquid, irradiating UV light to set the liquid. As the ultraviolet ray-curable resins, there are acrylic resins such as urethane acrylate, epoxy acrylate, polyester acrylate, etc. These materials can be used solely or can be mixed to be used. Further, use of not only a single layer but also a multilayer is possible.

As the method of forming the protective layer, there are coating methods such as spin coating, cast and the like, sputtering, chemical evaporation, etc. Among these, spin coating is preferable.

The film thickness of the protective layer is generally within a range from 0.1 to 100 µm. In this optical recording medium, the film thickness of the protective layer is preferably from 3 to 50 µm.

A print accepting layer, on which writing (printing) is possible with various printers such as ink-jet printer, thermal printer and the like, or various writing tools, may be put on a surface that is not a surface through which the recording/reading beam comes in, as required.

Alternatively, it is possible to bond two optical recording media having this structure, with the first substrate 1 being on the outer side, to form a larger-capacity medium having four recording layers.

[1-2] Optical Recording Medium of Type 2

Figure 2:
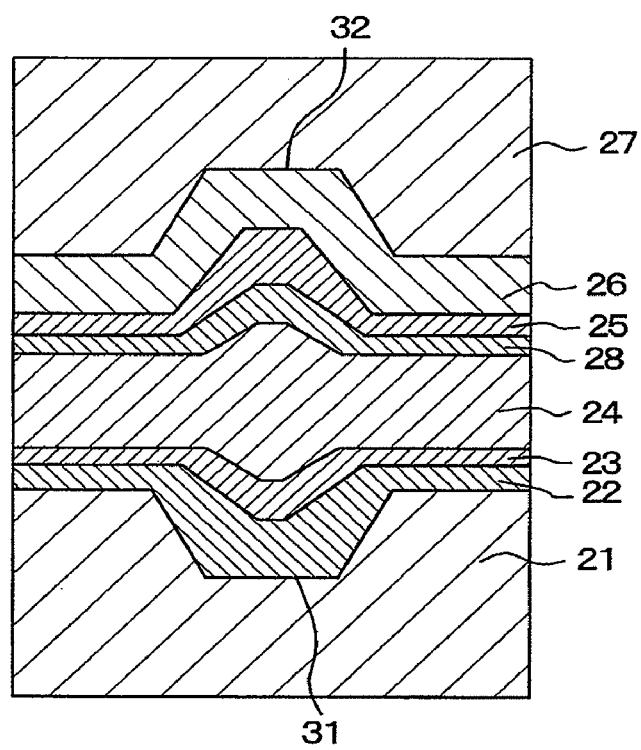
FIG. 2 is a diagram typically showing an optical recording medium (of type 2) according to the first embodiment of this invention.

FIG. 2 is a sectional view of a typical optical recording medium (of type 2) according to this embodiment.

The optical recording medium (bonded dual-layer DVD-R of a single-sided incident type) of type 2 according to this embodiment has a first recording layer (first recording layer, first dye containing recording layer) 22 containing a dye, a semitransparent reflective layer (hereinafter referred to as a semitransparent reflective layer, first reflective layer) 23, a transparent adhesive layer (intermediate layer) 24, a buffer layer 28, a second recording layer (second recording layer, second dye containing recording layer) 25 containing a dye, a reflective layer (second reflective layer) 26, a second substrate (second substrate) in a disk-like shape 27 in this order on a disk-like shaped, transparent (light-transmissible) first substrate (first substrate, first light-transmissible substrate) 21. The optical beam is radiated from the side of the first substrate 21 to perform recording/reading. In this embodiment, "transparent" signifies "transparent" to the optical beams used for recording on or reading from the optical recording medium like the first embodiment.

Namely, the single-sided incident DVD-R of a bonded dual-layer type has a first information recording body formed by stacking at least the first dye containing recording layer 22 containing a first dye and the semitransparent reflective layer 23 in order on the first substrate 21 having guide grooves, and a second information recording body formed by stacking at least the reflective layer 26 and the second dye containing recording layer 25 containing a second dye in order on the second substrate 27 having guide grooves. This DVD-R is formed by facing the opposite sides of the substrates of the first information recording body and the second information recording body to each other, and bonding them through the optically transparent adhesive layer.

Concavities and convexities are formed on the first substrate 21 and the second substrate 27 to form respective recording tracks. The recording track may be the convex portion or the concave portion. However, it is preferable that the recording track 31 on the first substrate 21 is formed with the convex portion with respect to the direction of the incident light beams, whereas the recording track 32 on the second substrate 27 is formed with the concave portion with respect to the direction of the incident light beams. The substrate may have concave and convex pits as required. According to this embodiment, the convexity and the concavity are defined with respect to the direction of the incident light beams used for recording or reading unless specifically mentioned.

Next, each of the layers will be described.

The first substrate 21, the first recording layer 22, the semitransparent reflective layer 23, the second recording layer 25 and the reflective layer 26 of the bonded dual-layer DVD-R of the single-sided incident type according to this embodiment are almost similar in structure to the first substrate 1, the first recording layer 2, the semitransparent reflective layer 3, the second recording layer 5 and the reflective layer 6 of the stacked dual-layer DVD-R of the single-sided incident type according to the first embodiment.

The transparent adhesive layer 24 as being the intermediate layer is almost similar in structure to the intermediate resin layer 4 of the laminated dual-layer DVD-R of the single-sided incident type according to the first embodiment except that there is no need to form the grooves and pits with concavities and convexities. Incidentally, the above grooves and pits are formed on the second substrate 27 to be described later.

The buffer layer 28 as being the intermediate layer is almost similar in structure to the buffer layer described above in the first embodiment. The buffer layer may be formed only when necessary.

It is preferable that the second substrate 27 has shape stability so that the optical recording medium has some degree of rigidity. Namely, it is preferable that the second substrate 27 has high mechanical stability and large rigidity. When the first substrate 21 does not have sufficient shape stability, the second substrate 27 is required to have particularly high shape stability. In this viewpoint, the second substrate 27 preferably has low moisture absorption.

It is preferable that the second substrate 27 has good molding property because concavities and convexities are (recording tracks) formed thereon. The second substrate 27 is not required to be transparent. However, when the second substrate 27 is transparent, measurement of the film thickness of the second recording layer 25 becomes easy in the manufacturing process, which is preferable.

As such material, there can be used resins such as acrylic resins, methacrylic resins, polycarbonate resin, polyolefin resins (particularly amorphous polyolefin), polyester resins, polystyrene resin, epoxy resin and so forth, and glass.

On the second substrate 27, concavities and convexities are spirally or concentrically formed to form grooves and lands. Generally, such grooves and/or lands are used as recording tracks to record or read information on or from the second recording layer 25. Since the second recording layer 25 is generally formed in coating, the film thickness thereof is large at the groove portion so that the groove portion is suitable for recording or reading. It is preferable in this optical recording medium to assign the groove portion, that is, the concave portion to the direction of the incident light beam, of the second substrate 27 as the recording track 32. Here, "concave portion" and "convex portion" signify "concave portion" and "convex portion" with respect to the direction of the incident light beam. Generally, the groove has a width of about 50 to 500 nm, and has a depth of about 10 to 250 nm. When the recording track is spiral, it is preferable that the track pitch is approximately 0.1 to 2.0 μm. The second substrate 27 may have concave/convex pits such as land pre-pits as required.

From the standpoint of cost, it is preferable that the second substrate 27 having such concavities and convexities is made from a resin and manufactured in injection molding with a stamper having concavities and convexities. When a resin layer made from a radiation setting resin such as a photo-setting resin or the like is formed on the substrate body made from glass or the like, concavities and convexities for recording tracks or the like may be formed on the resin layer.

Although this invention is suited to record data in a write-once optical recording medium (DVD-R) having a dye containing recording layer having the above structure, this invention can be applied to an optical recording medium having another structure so long as it is an optical recording medium (multilayer optical recording medium) having a plurality of recording layers. For example, this invention can be applied to a rewritable optical recording medium (for example, DVD-RW, DVD+RW, DVD-RAM or the like) having a phase-change recording layer as being a recording layer in which a portion in the crystalline state is used as the unrecorded state/erased state, whereas a portion in the amorphous state is used as the recorded state, or an magneto-optical recording medium having a magnetic recording layer as the recording layer, for example. This invention can be applied to not only optical recording media of the substrate surface incident type but also optical recording media of a so-called film surface incident type.

[2] Recording Apparatus for Optical Recording Medium

Next, description will be made of a recording apparatus for the optical recording medium according to this embodiment with reference to FIG. 3.

Figure 3:
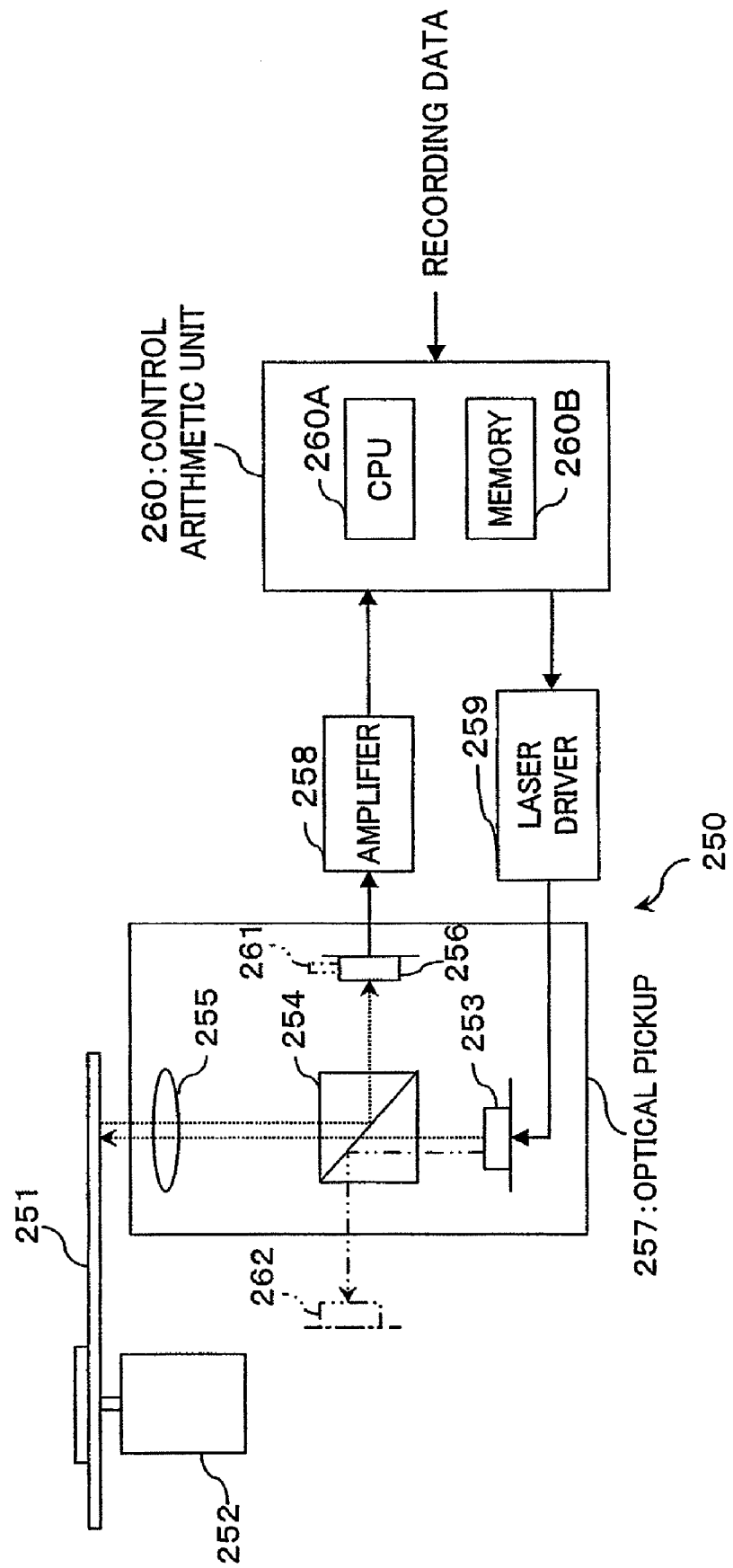
FIG. 3 is a diagram typically showing the whole structure of a recording apparatus for the optical recording medium according to the first embodiment of this invention.

As shown in FIG. 3, a recording apparatus (drive, writer) 250 for this optical recording medium comprises a spindle motor 252 driving an optical recording medium 251 to rotate the same, a semiconductor laser (laser light source) 253 such as a laser diode (LD) or the like, a beam splitter 254, an objective lens 255, an optical pickup 257 including a photo-detector 256 such as a photo diode (PD) or the like, an amplifier 258 amplifying a signal detected by the optical pickup 257, a laser driver (driving unit; for example, driving circuit) 259 driving the semiconductor laser 253, and a control arithmetic unit 260 [including a CPU 260A and a memory (storing unit) 260B, for example].

When a record instruction (write instruction) is inputted to the control arithmetic unit 260, the control arithmetic unit 260 outputs a control signal to the laser driver 259, and the laser driver 259 drives the semiconductor laser 253. Whereby, the semiconductor laser 253 emits a laser beam (recording beam) to a desired recording layer of the optical recording medium 251 through the beam splitter 254, the objective lens 255, etc. to record data.

In data recording, the quantity of light of the reflected light beam from the optical recording medium 251 is detected by the photo-detector 256 through the beam splitter 254, amplified by the amplifier 258, and inputted to the control arithmetic unit 260. The control arithmetic unit 260 optimizes the power of the laser beam outputted from the semiconductor laser 253, that is, the control arithmetic unit 260 performs the optimum power control (OPC).

In this embodiment, "OPC" is required to only determine the optimum value, thus any method is available. The optimum value determined in the OPC is referred to as an OPC recording power.

During the data recording, the control arithmetic unit 260 monitors the quantity of light of the returning light beam (reflected light; returning light of the recording beam) reflected by the optical recording medium 251, and controls the recording power (laser power) so that a decrease in the quantity of reflected light beam at the time that a recording mark is formed is constant (that is, so that the asymmetry is constant).

Recording in this optical recording medium (of the type 1 and the type 2) is performed by irradiating a laser beam converging to a diameter of approximately 0.5 to 1 μm on the recording layer from the side of the first substrate 1 or 21. In a portion on which the laser beam is emitted, thermal deformation of the recording layer such as decomposition, exothermic reaction, dissolution, etc. occurs due to absorption of the energy of the laser beam, whereby the chemical properties thereof are changed.

Reading of recorded information is performed by reading, with the laser beam, a difference in reflectance between a portion in which the optical properties have changed and a portion in which the optical properties remains unchanged.

Recording or reading are performed on each of the two recording layers in the following manner. Whether the converging position of the converged laser is on the first recording layer 2, 22 or the second recording layer 5, 25 can be discriminated by using a focus error signal obtained in the knife edge method, astigmatism method, Foucault method or the like. Namely, when the objective lens for converging the laser beam is shifted in the vertical direction, a different S-shaped curve is obtained according to whether the focus position of the laser beam is on the first recording layer 2, 22 or on the second recording layer 5, 25. It is possible to select the first recording layer 2, 22 or the second recording layer 5, 25 to be recorded or read by selecting which S-shaped curve is used for focusing servo.

In the optical recording medium of the type 1, it is preferable that concavities and convexities are formed on the first substrate 1 and the intermediate resin layer 4, and the convex portion of the first substrate 1 and the convex portion of the intermediate resin layer 4 are used as recording tracks to perform recording or reading, as shown in FIG. 1. Since the dye recording layer is generally formed in coating, the film thereof is thick at the groove, which is thus suitable for recording or reading. In the optical recording medium of the type 1, it is preferable that the groove, that is, the convex portion to the direction of the incident light beam, of the first substrate 1 is used as a recording track 11, whereas the groove, that is, the convex portion to the direction of the incident light beam, of the intermediate resin layer 4 is used as a recording track 12.

In the optical recording medium of the type 2, it is preferable that concavities and convexities are formed on the first substrate 21 and the second substrate 27, and the convex portion of the first substrate 21 and the concave portion of the second substrate 27 are used as recording tracks to perform recording or reading, as shown in FIG. 2. Incidentally, there is a case where the polarity of the tracking servo control on the first recording layer 22 is opposite to that of the tracking servo control on the second recording layer 25. In the optical recording medium of the type 2, it is preferable that the groove, that is, the convex portion to the direction of the incident light beam, of the first substrate 21 is used as a recording track 31, whereas the groove, that is the concave portion to the direction of the incident light beam, of the second substrate 27 is used as a recording track 32.

As the laser beam used for this optical recording media (of the type 1 and the type 2), $N_2$, He—Cd, Ar, He—Ne, ruby, semiconductor, dye laser, etc. are available. Among these, the semiconductor laser is preferable because of its light weight, compactness, facility, etc.

It is preferable that the wavelength of the used laser beam is as shorter as possible for the purpose of high-density recording. Particularly, the laser beam having a wavelength of 350 to 530 nm is preferable. As a typical example of such laser beam, there are laser beams having center wavelengths of 405 nm, 410 nm and 515 nm.

An example of the laser beam having a wavelength within a range from 350 to 530 nm can be obtained by using a 405 nm or 410 nm blue high-power semiconductor laser or a 515 nm bluish green high-power semiconductor laser. Other than these, the laser beam can be obtained by wavelength-modulating, by means of a second harmonic generating element (SHG), either (a) a semiconductor laser that can continuously oscillate fundamental oscillation wavelengths of 740 to 960 nm, or (b) a solid state laser that is excited by a semiconductor laser to be able to continuously oscillate fundamental oscillation wavelengths of 740 to 960 nm.

As the above SHG, any piezo element lacking inversion symmetry is usable, but KDP, ADP, BNN, KN, LBO and compound semiconductors are preferable. As practical examples of the second harmonic wave, there are 430 nm which is a double of 860 nm in the case of a semiconductor laser having a fundamental oscillation wavelength of 860 nm, 430 nm which is a double of 860 nm from Cr-doped $LiSrAlF_6$ crystal (having a fundamental oscillation wavelength of 860 nm) in the case of a solid laser excited by a semiconductor laser, etc.

[3] Recording Method for Optical Recording Medium

Next, description will be made of a process (recording method for the optical recording medium) carried out by executing a predetermined program by the control arithmetic unit 260 of the recording apparatus 250 for the optical recording medium structured as above with reference to FIG. 4.

When data is recorded in the above dual-layer DVD-R of the single-sided incident type (refer to FIGS. 1 and 2), data is first recorded in the second recording layer 5 (25) far from the surface from which the laser beam comes in, data is then recorded on the first recording layer 2 (22) close to the surface from which the laser beam comes in.

In the recording apparatus 250 for this optical recording medium, recording conditions such as a recording recommended power and the like which are recorded, in relation with layer information on each of the recording layers 2 and 5 (22 and 25), in the optical recording medium 251 are read out according to an instruction from the control arithmetic unit 260 before recording on the optical recording medium 251 is performed (for example, when the medium is loaded to the apparatus), The recording conditions are related to the layer information on each of the recording layers 2 and 25 (22 and 25) and stored in the memory 260B.

Figure 4:
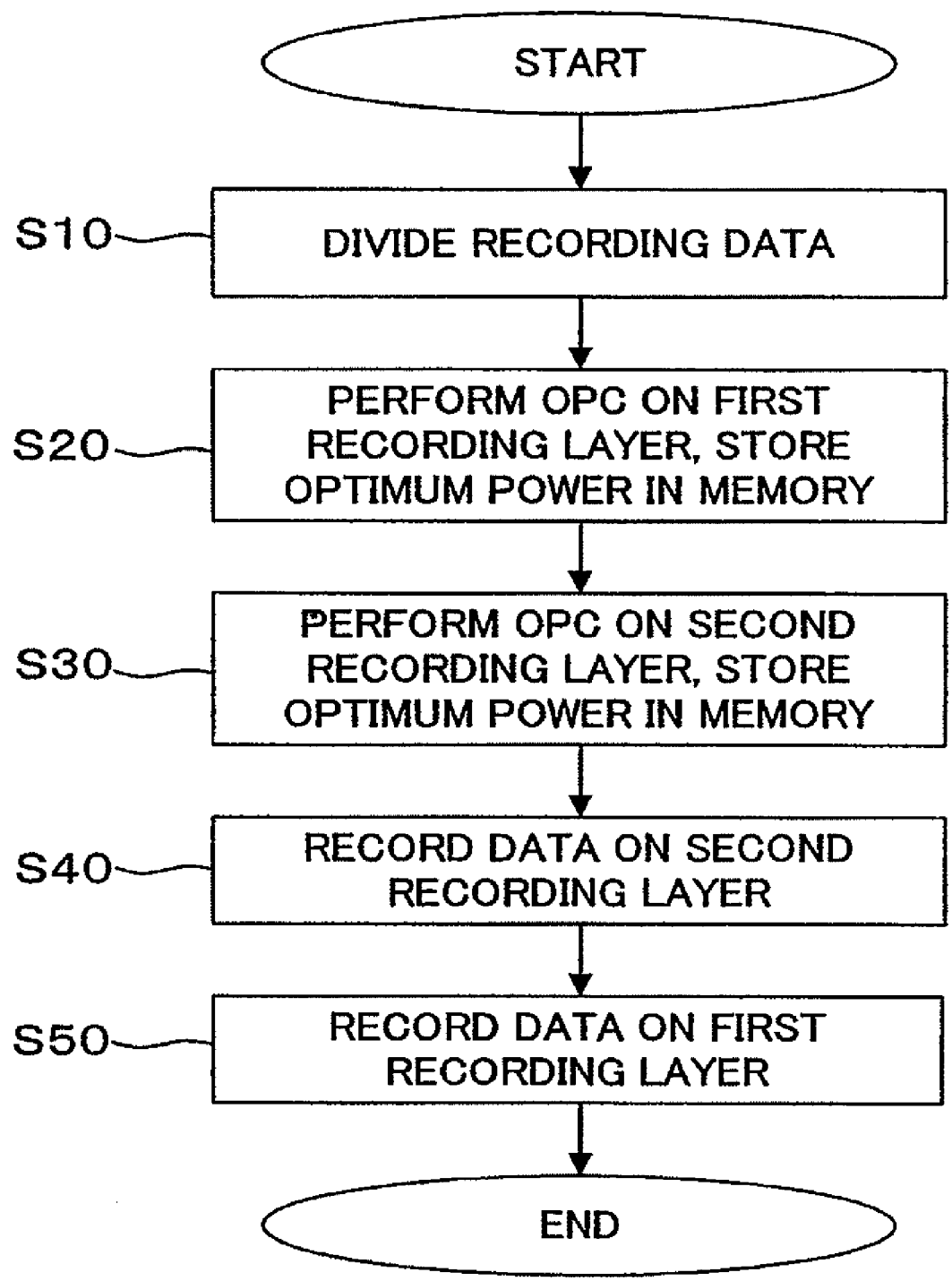
FIG. 4 is a flowchart for illustrating a recording method for the optical recording medium according to the first embodiment of this invention.

As shown in FIG. 4, when a record instruction is inputted to the recording apparatus 250 for the optical recording medium from a computer such as a personal computer or the like (or through an input unit such as a button equipped to the drive thereof), the control arithmetic unit 260 captures recording data (recording pulses, continuous data) sent from the personal computer or another equipment, for example, and divides it into a portion to be recorded on the first recording layer 2 (22) and a portion to be recorded on the second recording layer 5 (25). This function of the control arithmetic unit 260 is referred to as a data dividing unit.

Namely, the continuous data sent to be recorded on the optical recording medium 251 having two recording layers 2 and 5 (22 and 25) is divided into a first half continuous data and the latter half continuous data. Here, the first half continuous data is assigned as a portion to be recorded on the first recording layer 2 (22) close to the side from which the incident light beam comes in, and the latter half continuous data is assigned as a portion to be recorded on the second recording layer 5 (25) far from the side from which the incident light beam comes in.

The control arithmetic unit 260 controls the optical pickup 257 to perform the focusing servo control on the first recording layer 2 (22), thereby to perform the optimum power control on the power (laser power) of a laser beam outputted from the semiconductor laser 253 through the laser driver 259 (step S20). Here, the control arithmetic unit 260 reads out the recording recommended power from the memory 260B on the basis of the layer information on the first recording layer 2 (22), and performs the OPC on the basis of the recording recommended power read out. This function of the control arithmetic unit 260 is referred to as an optimum power control unit.

Namely, in order to perform trial writing in the power calibration area (PCA recording power calibration area) set on the first recording layer 2 (22) on which the focusing servo control has been performed, with different laser powers, the control arithmetic unit 260 controls the optical pickup 257 to adjust the laser power to the optimum power (optimum recording power, OPC recording power) to the first recording layer 2 (22). The control arithmetic unit 260 then stores the optimum power (a laser current value corresponding to the optimum power) to the first recording layer 2 (22) obtained by performing the OPC in the memory 260B.

Next, the control arithmetic unit 260 controls the optical pickup 257 to perform the focusing servo control on the second recording layer 5 (25), thereby to perform the optimum power control (OPC) on the power (laser power) of the laser beam outputted from the semiconductor laser 253 through the laser driver 259 (step S30). Here, the control arithmetic unit 260 reads out the recording recommended power from the memory on the basis of the layer information on the second recording layer 5 (25), and performs the OPC on the basis of the recording recommended power read out. This function of the control arithmetic unit 260 is referred to as an optimum power control unit.

Namely, in order to perform trial writing in the PCA set on the second recording layer 5 (25) on which the focusing servo control has been performed, with different laser powers, the control arithmetic unit 260 controls the optical pickup 257 to adjust the laser power to the optimum power (optimum recording power, OPC recording power) to the second recording layer 5 (25). The control arithmetic unit 260 then stores the optimum power (a laser current value corresponding to the optimum power) to the second recording layer 5 (25) obtained by performing the OPC in the memory 260B.

Since the OPC recording powers to the respective recording layers 2 and 5 (22 and 25) are set at the above steps S20 and S30, these steps are referred to as an OPC recording power setting step.

After the OPC is performed on all the recording layers [here, the first recording layer 2 (22) and the second recording layer 5 (25)], data is recorded on the recording layers 2 and 5 (22 and 25). As described above, the data is first recorded on the second recording layer 5 (25), then continuously recorded on the first recording layer 2 (22).

The control arithmetic unit 260 reads out the optimum power to the second recording layer 5 (25) stored in the memory 260B, drives the semiconductor laser 253 through the laser driver 259, controls the recording power of the semiconductor laser 253 to the optimum power (a laser current value corresponding to the optimum power) to the second recording layer 5 (25), and records the latter half continuous data on the second recording layer 5 (25) (step S40). This function of the control arithmetic unit 260 is referred to as a data recording unit.

When continuously performing a recording on the first recording layer 2 (22) after the recording on the second recording layer 5 (25), the control arithmetic unit 260 controls the recording power of the semiconductor laser 253 to a recording power (a laser current value corresponding to the recording power) at the time of a start of the recording on the first recording layer 2 (22), and records the first half continuous data on the first recording layer 2 (22).

The above recording apparatus and recording method have an advantage that the recording power to be used when data is recorded on the recording layers 2 and 5 (22 and 25) can be accurately adjusted to attain good recording. As a result, when data is continuously recorded on the recording layers 2 and 5 (22 and 25) of the optical recording medium 251 having a plurality of recording layers 2 and 5 (22 and 25), for example, it is possible to carry out good recording on each of the recording layers 2 and 5 (22 and 25).

In the above description, recording on the first recording layer 2 or 22 is performed after recording on the second recording layer 5 or 25 is performed. However, it is possible that the recording on the second recording layer 2 or 25 is performed after recording on the first recording layer 2 or 22 is performed, as a matter of course.

[4] Area Structure of Optical Recording Medium and Optimization of Recording Power When a laser beam is irradiated from the side of the first substrate 1 or 21 to perform recording on a medium, the recording is first performed on the first recording layer 2 or 22, and the recording on the second recording layer 5 or 25 is started when a recordable area in the recording layer 2 or 22 is consumed.

Hereinafter, description will be made of the area structure and the recoding power (intensity) optimization in the case where recording is performed from the inner peripheral side toward the outer peripheral side of the second recording layer 5 or 25 after recording is performed from the inner peripheral side toward the outer peripheral side of the first recording layer 2 or 22.

In this optical recording medium, optimization (OPC) of the recording power of the laser beam for each recording layer is performed, using the power calibration area (PCA) before the recording is actually started on each recording layer.

Figure 5A:
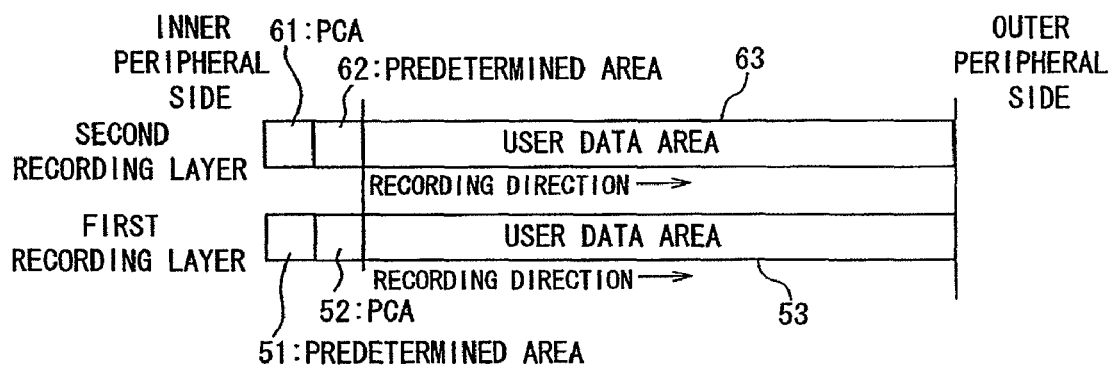
FIG. 5(A) is an area structure diagram for illustrating an area structure of the optical recording media (of the type 1 and the type 2), and optimization of a recording power according to the first embodiment of this invention.

As shown in FIG. 5(A), a predetermined area 51, a PCA 52, a user data area 53 are arranged on the first recording layer 2 or 22 of this optical recording medium from the inner peripheral side toward the outer peripheral side of the disk.

On the second recording layer 5 or 25, a PCA 61, a predetermined area 62 and a user data area 63 are arranged from the inner peripheral side toward the outer peripheral side of the disk.

In each of the user data area 53 and 63, a lead-in area, an information recording area, a lead-out area, etc. are included.

Figure 5B:
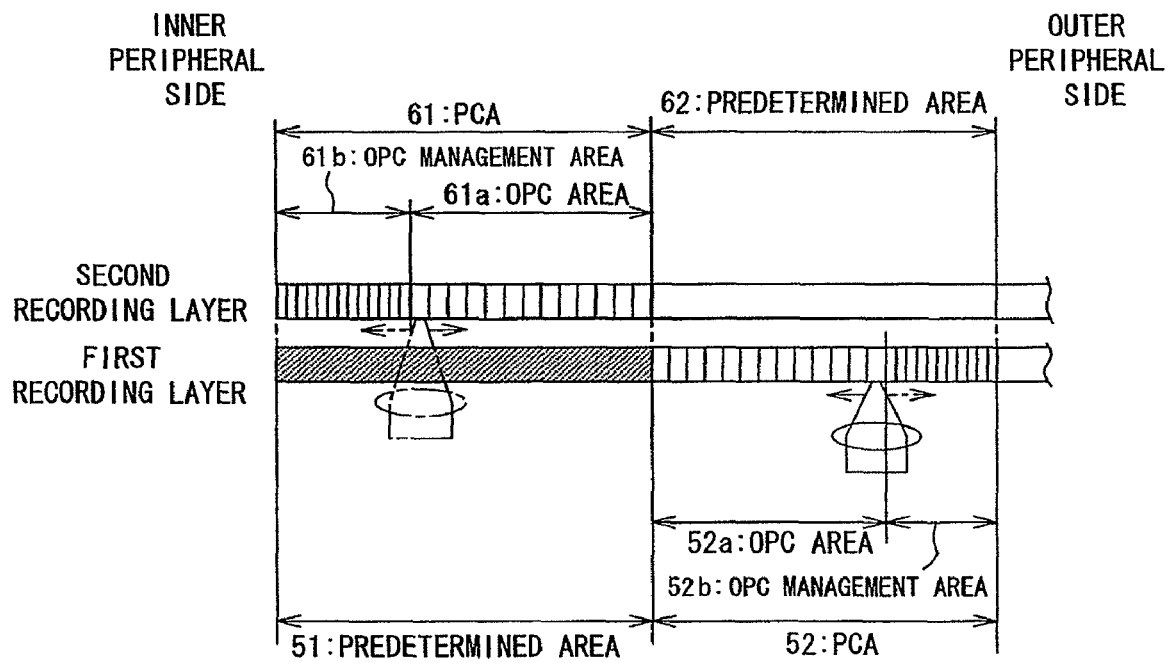
FIG. 5(B) is an enlarged diagram of essential parts in FIG. 5(A)

As shown in FIG. 5(B), the PCA 52 of the first recording layer 2 or 22 is divided into an OPC area 52a for performing trial writing by irradiating the laser beam, and an OPC management area 52b for recording the number of times the trial writing has been performed, etc. Each of the areas 52a and 52b consists of a plurality of partitions, and one partition (2418 bytes) is used for one OPC process in each of the areas 52a and 52b. The partitions in the OPC area 52a are used from the outer peripheral side toward the inner peripheral side, whereas the partitions in the OPC management area 52b are used from the inner peripheral side toward the outer peripheral side, for example.

When recording is performed on the first recording layer 2 or 22 with a laser beam, trail writing is performed by irradiating laser beams having various powers on one partition in the OPC area 52a, reading of the records written on trails is repeated, a recording power of the laser beam with which reading can be performed most appropriately is determined, and the state of use of the OPC area 52a such as the number of times trial writing has been performed, etc. is recorded in one partition in the OPC management area 52b.

The PCA 61 of the second recording layer 5 or 25 is divided into an OPC area 61a for performing trial writing is performed by irradiating the laser beam, and an OPC management area 61b for recording the number of times trial writing has been performed, etc. Each of the areas 61a and 61b consists of a plurality of partitions. One partition is used for one OPC process in each of the areas 61a and 61b. The partitions in the OPC area 61a are used from the inner peripheral side toward the outer peripheral side, whereas the partitions in the OPC management area 61b are used from the outer peripheral side toward the inner peripheral side, for example.

When recording is performed on the second recording layer 5 or 25 with a laser beam, laser beams having various powers are emitted on one partition in the OPC area 61a to perform trial writing, reading of the records written on trails is repeated, a recording power of the laser beam with which reading can be performed most appropriately is determined, and the state of use of the OPC area 61a such as the number of times trail writing has been performed, etc. is recorded in one partition in the OPC management area 61a.

The predetermined area 62 in the second recording layer 5 or 25 is in the state (un-recorded state) where nothing is recorded. In this optical recording medium, since recording on the second recording layer 5 or 25 is performed after recording on the first recording layer 2 or 22 is completed as stated above, the second recording layer 5 or 25 is in the un-recorded state when recording is performed on the first recording layer 2 or 22. For this, by making the predetermined area 62 in the un-recorded state like the second recording layer 5 or 25, it is possible to perform the OPC process on the first recording layer 2 or 22 in a state closer to the practical recording conditions.

On the other hand, the predetermined area 51 in the first recording area 2 or 22 is in the previously-recorded state. In this optical recording medium, since recording on the second recording layer 5 or 25 is performed after recording on the first recording layer 2 or 22 is completed as stated above, the first recording layer is already in the recorded state when recording is performed on the second layer 5 or 25. For this, by making the predetermined area 51 in the recorded state like the first recording layer 2 or 22, it is possible to perform the OPC process on the second recording layer 5 or 25 in a state closer to the practical recording conditions.

When the applied medium is a DVD-R, it is preferable that a record in conformity with EFM+ that is a recording method for DVD-R is recorded in the predetermined area 51. For example, the length of a mark or a space is preferably within a range of 3 T to 14 T when the reference clock cycle of recording is T, and a ratio of mark to space is preferably 0.9 to 1.1, and more preferably 1.0 (that is, 50% duty). As this, it is preferable that the record is recorded in the same method as the recording method generally used for data recording on the applied medium.

Recording in the predetermined area 51 may be performed by the manufacturer when the disk is manufactured, or may be performed by the user with a drive when the user purchases the disk. In either case, it is only necessary that the predetermined area 51 in the first recording layer 2 or 22 is already recorded before the first OPC process for the second recording layer 5 or 25 is started.

As this optical recording medium is structured as above, the OPC process for the first recording layer 2 or 22 is performed in the PCA 52 of the first recording layer 2 or 22 before recording on the first recording layer 2 or 22 is started. At this time, the second recording layer 5 or 25 covered with the OPC area 52a of the first recording layer 2 or 22 when looked from the laser beam is in the un-recorded state. Accordingly, it is possible to perform the OPC process for the first recording layer 2 or 22 in a state closer to the actual recording state, whereby the optimum recording power to the first recording layer 2 or 22 can be determined.

When recording on the first recording layer 2 or 22 is started thereafter, the OPC process for the first recording layer 2 or 22 is performed in the PCA 52 of the first recording layer 2 or 22.

When the recording on the entire first recording layer 2 or 22 is completed, the OPC process for the second recording layer 5 or 25 is performed in the PCA 61 of the second recording layer 5 or 25. At this time, the first recording layer 2 or 22 overlapping on the OPC area 61a of the second recording layer 5 or 25 when looked from the laser beam is in the previously-recorded state. Accordingly, it is possible to perform the OPC process for the second recording layer 5 or 25 in a state closer to the actual recording state, whereby the optimum recording power to the second recording layer 5 or 25 can be determined.

By arranging the OPC area 61a of the second recording layer 5 or 25 not so as to be covered with the OPC area 52a of the first recording layer 2 or 22, it is possible to perform the OPC process for the second recording layer 5 or 25 without affected by the recording state of the OPC area 52a of the first recording layer 2 or 22. Accordingly, it is possible to determine the optimum recording power to the second recording layer 5 or 25, as well.

It is, of course, possible to beforehand record a recommended recording power of the laser beam in the medium, as stated above. In concrete, a recommended recording power value for each of the recording layers 2 and 5 (22 and 25) is recorded with wobble of the recording track. Alternatively, it is possible to record the recommended recording power value with pre-pits (land pre-pits) or the like in an area (not shown) formed between the recording management area [RMA: an area formed between PCA and lead-in area (not shown)] of each of the recording layers 2 and 5 (22 and 25). The recommended recording power value recorded as this is referred when the OPC process is performed, whereby the optimum recording power can be determined more quickly.

In this embodiment, the second recording layer 5 or 25 covered with the OPC area 52a of the first recording layer 2 or 22 is in the un-recorded state. However, it is preferable that at least a part of the second recording layer 5 or 25 is in the un-recorded state. The first recording layer 2 or 22 overlapping on the OPC area 61a of the second recording layer 5 or 25 is in the previously-recorded state. However, it is preferable that at least a part of the first recording layer 2 or 22 is in the previously-recorded state.

In this embodiment, recording on the second recording layer 5 or 25 is performed after recording on the first recording layer 2 or 22 is completed. However, it is possible to perform recording on the first recording layer 2 or 22 after recording on the second recording layer 5 or 25 is completed.

In which case, since the first recording layer 2 or 22 is in the un-recorded state when recording on the second recording layer 5 or 25 is performed, it is preferable that the predetermined area 51 of the first recording layer 2 or 22 is in the un-recorded state. By doing so, it becomes possible to perform the OPC process for the second recording layer 5 or 25 in a state closer to the actual recording conditions, and determine the optimum power to the second recording layer 5 or 25.

Since the second recording layer 5 or 25 is in an already-recorded state when recording on the first recording layer 2 or 22 is performed after recording on the second recording layer 5 or 25 is completed, it is preferable to make the predetermined area 62 of the second recording layer 5 or 25 be in the previously-recorded state. By doing so, it becomes possible to perform the OPC process for the first recording layer 2 or 22 in a state closer to the actual recording conditions, and determine the optimum power to the first recording layer 2 or 22.

As shown in FIG. 5(A), it is preferable that the PCAs 52 and 61 are arranged at positions close to positions at which recording is started because the laser beam can access there more easily. However, it is alternatively possible to arrange the PCAs 52 and 61 on the outer peripheral side of the user data areas 53 and 63, together with the predetermined areas 51 and 62. In which case, it is preferable that recording on the first recording layer 2 or 22 and the second recording layer 5 or 25 is performed from the outer peripheral side toward the inner peripheral side in order to allow the laser beam to access there easily.

Still alternatively, it is possible to arrange the PCAs 52 and 61, and the predetermined areas 51 and 62 on both the inner peripheral side and the outer peripheral side, or arrange a plurality of PCAs and a plurality of predetermined areas in the radial direction.

[5] Another Recording Method for Optical Recording Medium

Hereinafter, description will be made of another recording method for the optical recoding medium according to this embodiment, that is, a process performed by executing a predetermined program by the control arithmetic unit 260 of the recording apparatus 250 for the optical recording medium structured as above, with reference to FIGS. 8, 9(A), 9(B), 10(A) and 10(B).

Here, the description will be made by way of example where data is recorded in the above dual-layer, single-sided incident type DVD-R (refer to FIGS. 1 and 2), the data is recorded on the second recording layer 5 (25) far from the side from which the laser beam comes in, the data is then continuously recorded on the first recording layer 2 (22) close to the side from which the laser beam comes in. Incidentally, "continuously recording" signifies that a time interval between an end of the recording on the first recording layer 2 (22) and a start of the recording on the second recording layer 5 (25) is not considerable (within a predetermined time; for example, within 10 minutes, preferably within 5 minutes).

In this recording apparatus 250 for the optical recording medium, recording conditions such as recording recommended powers and the like, which are recorded in relation with the layer information on the recording layers 2 and 5 (22 and 25) in the optical recording medium 251, are read out according to an instruction from the control arithmetic unit 260 before the recording on the optical recording medium 251 is performed (for example, when the medium is loaded), and the recording conditions are related with the layer information on each of the recording layers 2 and 5 (22 and 25) and stored in the memory 260B.

Figure 8:
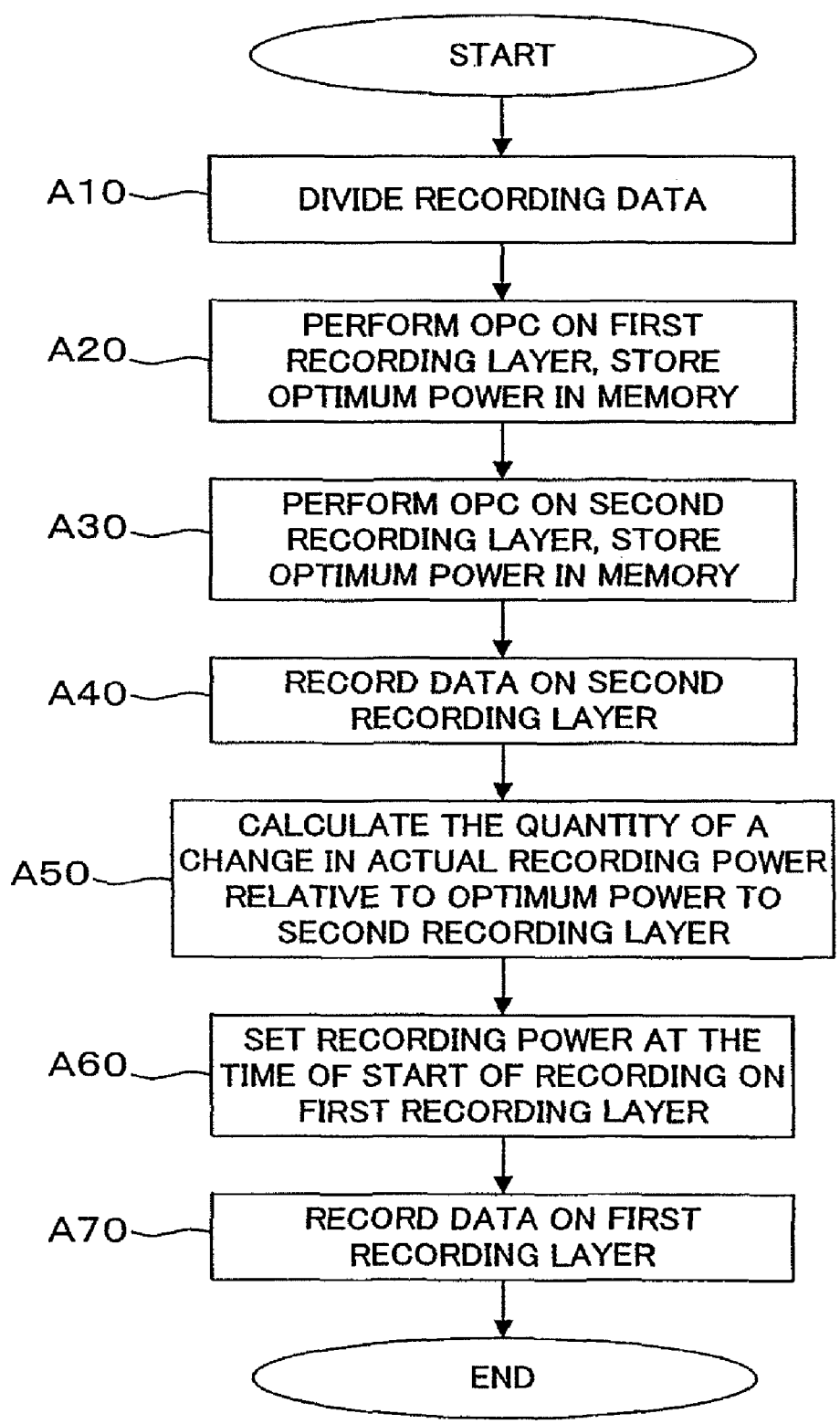
FIG. 8 is a flowchart for illustrating a recording method for the optical recording medium according to a fourth embodiment of this invention.

As shown in FIG. 8, when a record instruction is inputted from, for example, a computer such as a personal computer (or through an input unit such as a button equipped to the drive itself) to this recording apparatus 250 for the optical recording medium, the control arithmetic unit 260 captures data to be recorded (recording pulses, continuous data) send from, for example, the personal computer or another equipment, and divides the data into a portion to be recorded on the first recording layer 2 (22) and a portion to be recorded on the second recording layer 5 (25) (step A10). This function of the control arithmetic unit 260 is referred to as a data dividing unit.

In other words, continuous data sent to be recorded on the optical recording medium 51 having two recording layers 2 and 5 (22 and 25) is divided into a first half continuous data and the latter half continuous data. Here, the first half continuous data is to be recorded on the first recording layer 2 (22) close to the side from which the incident light beam comes in, whereas the latter half continuous data is to be recorded on the second recording layer 5 (25) far from the side from which the incident light beam comes in.

Next, the control arithmetic unit 260 controls the optical pickup 257 to perform the focusing servo control for the first recording layer 2 (22), and performs the optimum power control (OPC) on the power of a laser beam outputted from the semiconductor laser 253 through the laser driver 259 (step A20). Here, the control arithmetic unit 260 reads out the recording recommended power from the memory 260B on the basis of the layer information on the first recording layer 2 (22), and performs the OPC on the basis of the recording recommended power read out. This function of the control arithmetic unit 260 is referred to as an optimum power control unit.

In order to perform trial writing with different laser powers in the power calibration areas (PCA, recording power calibration areas) arranged on both the inner peripheral side (in an inner peripheral portion) and the outer peripheral side (in an outer peripheral portion) of the data recording area of the first recording layer 2 (22) on which the focusing servo control has been performed, the control arithmetic unit 260 controls the optical pickup 257 to adjust the laser power to the optimum power (optimum recording power, OPC recording power) suited to the first recording layer 2 (22). The control arithmetic unit 260 stores the optimum power (a laser current value corresponding to the optimum power) to the first recording layer 2 (22) obtained by performing the OPC in the memory 260B.

Meanwhile, the OPC is performed in each of the PCAs provided on the inner peripheral side and the outer peripheral side of the data recording area of the first recording layer 2 (22). However, it is possible to perform the OPC in only the PCA arranged on the inner peripheral side of the first recording layer 2 (22), or only in the PCA arranged on the outer peripheral side of the first recording layer 2 (22), for example.

Next, the control arithmetic unit 260 controls the optical pickup 257 to perform the focusing servo control for the second recording layer 5 (25), thereby to perform the optimum power control (OPC) on the power (laser power) of the laser beam outputted from the semiconductor laser 253 through the laser driver 259 (step A30). Here, the control arithmetic unit 260 reads out the recording recommended power from the memory 260B on the basis of the layer information on the second recording layer 5 (25), and performs the OPC on the basis of the recording recommended power read out. This function of the control arithmetic unit 260 is referred to as an optimum power control unit.

In order to perform trial writing with different powers in the PCAs arranged on both the inner peripheral side and the outer peripheral side of the data recording area of the second recording layer 5 (25) on which the focusing servo control has been performed, the control arithmetic unit 260 controls the optical pickup 57 to adjust the laser power to the optimum power (optimum recording power, OPC recording power) to the second recording layer 5 (25). The control arithmetic unit 260 stores the optimum power (a laser current value corresponding to the optimum power) to the second recording layer 5 (25) obtained by performing the OPC in the memory 260B.

Meanwhile, the OPC is performed in each of the PCAs arranged on both the inner peripheral side and the outer peripheral side of the second recording layer 5 (25). However, this invention is not limited to this. It is alternatively possible to perform the OPC in only the PCA arranged on the inner peripheral side of the second recording layer 5 (25), or only in the PCA arranged on the outer peripheral side of the second recording layer 5 (25), for example.

Since the OPC recording powers for the respective recording layers 2 and 5 (22 and 25) are set at the above steps A20 and A30, these steps are referred to as an OPC recording power setting step.

According to this embodiment, data is recorded on the recording layers 2 and 5 (22 and 25) after the OPC is performed on all the recording layers [here, the first recording layer 2 (22) and the second recording layer 5 (25)]. Here, the data is first recorded on the second recording layer 5 (25), then continuously recorded on the first recording layer 2 (22).

First, the control arithmetic unit 260 reads out the optimum power to the second recording layer 5 (25) stored in the memory 260B, drives the semiconductor laser 253 through the laser driver 259, controls the recording power of the semiconductor laser 253 to the optimum power (a laser current value corresponding to the optimum power) to the second recording layer 5 (25), and records the latter half continuous data on the second recording layer 5 (25) from the outer peripheral side toward the inner peripheral side (step A40). This function of the control arithmetic unit 260 is referred to as a data recording unit.

According to this embodiment, a running OPC is performed during the data recording. Namely, the control arithmetic unit 260 monitors the quantity of light of the returning light beam (reflected light; returning light of the recording beam) reflected by the optical recording medium 251 during the recording on the second recording layer 5 (25), and controls the recording power (laser power) to make the decrease in the quantity of reflected light beam (the quantity of a change in the quantity of reflected light) during recording of marks constant (that is, the asymmetry is constant). Whereby, recording with the optimum asymmetry becomes possible. This function of the control arithmetic unit 260 is referred to as a running OPC unit.

Figure 9A:
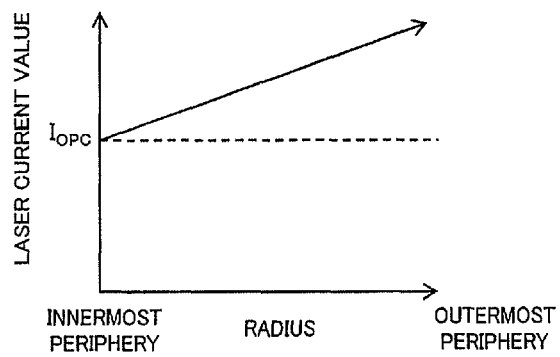
FIGS. 9(A) and 9(B) are diagrams for illustrating changes in laser current value and recording power occurring when a running OPC is performed while data is recorded in the optical recording medium according to the fourth embodiment of this invention.

FIG. 9(A) is a diagram showing a relationship between positions in the radial direction on the optical recording medium 251 and laser current values supplied to the semiconductor laser 253 at the time that the running OPC is performed. In FIG. 9(A), a laser current value corresponding to the optimum power (OPC recording power) obtained in the OPC is denoted by Iopc.

When the running OPC is performed during data recording on the optical recording medium 251 from the inner peripheral side toward the outer peripheral side, the laser current value supplied to the semiconductor laser 253 tends to be gradually increased, as shown in FIG. 9(A).

If the recording is performed while the running OPC is performed, the actual laser current value supplied at positions on the side that the data recording is ended (here, on the outer peripheral side of the optical recording medium 251) is larger than the laser current value Iopc corresponding to the optimum power (OPC recording power) obtained in the OPC.

Figure 9B:
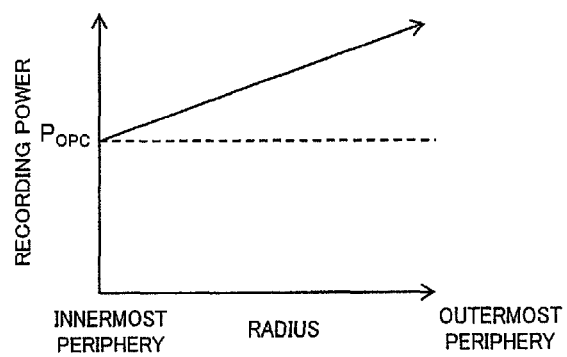

FIG. 9(B) is a diagram showing a relationship between positions in the radial direction on the optical recording medium 251 and recording powers (laser powers) of the laser beam outputted from the semiconductor laser 253 at the time that the running OPC is performed. In FIG. 9(B), the optimum power (OPC recording power) obtained in the OPC is denoted by Popc.

If the running OPC is performed during the data recording on the optical recording medium from the inner peripheral side toward the outer peripheral side, the recording power (laser power) of the laser beam outputted from the semiconductor laser 253 tends to be gradually increased, as shown in FIG. 9(B).

If recording is performed while the running OPC is performed, the actual recording power at positions on the side that the data recording is ended (here, the outer peripheral side of the optical recoding medium 251) is larger than the optimum power (OPC recording power) Popc obtained in the OPC. Incidentally, since the feedback control is performed on the basis of the quantity of the reflected light in the running OPC, the asymmetry is constant when the recording is performed while the running OPC is performed.

Since the actual recording power (actual laser current value) changes relative to the optimum power (OPC recording power) Popc (laser current value Iopc corresponding thereto) obtained in the OPC when the running OPC is performed, the recording power (laser current value) for the first recording layer 2 (22) is set in a manner to be described later to be used when the recording is started.

The running OPC is not always necessary although the running OPC is performed here.

Figure 10A:
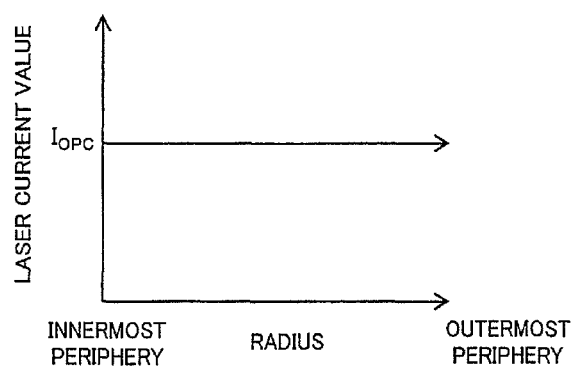
FIGS. 10(A) and 10(B) are diagrams for illustrating changes in laser current value and recording power occurring when the running OPC is not performed while data is recorded in the optical recording medium according to the fourth embodiment.

FIG. 10(A) is a diagram showing a relationship between positions in the radial direction on the optical recording medium 251 and laser current values supplied to the semiconductor laser 253 at the time that the running OPC is not performed. In FIG. 10(A), the laser current value corresponding to the optimum power (OPC recording power) obtained in the OPC is denoted by Iopc.

If the running OPC is not performed during data recording on the optical recording medium from the inner peripheral side toward the outer peripheral side, the laser current value supplied to the semiconductor laser 253 is constant, as shown in FIG. 10(A).

For this, the actual laser current value supplied at positions on the side that the data recording is ended (here, the outer peripheral side of the optical recording medium 251) is equal to the laser current value Iopc corresponding to the optimum power (OPC recording power) obtained in the OPC.

Figure 10B:
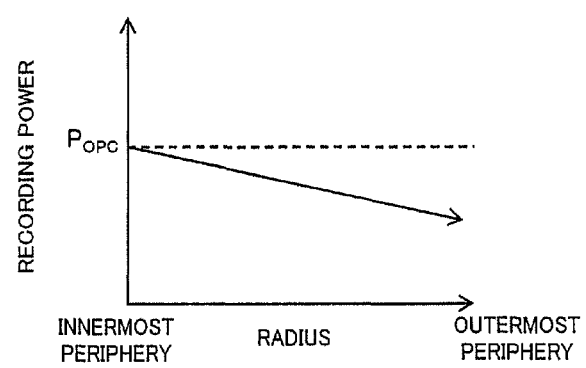
Figure 11:
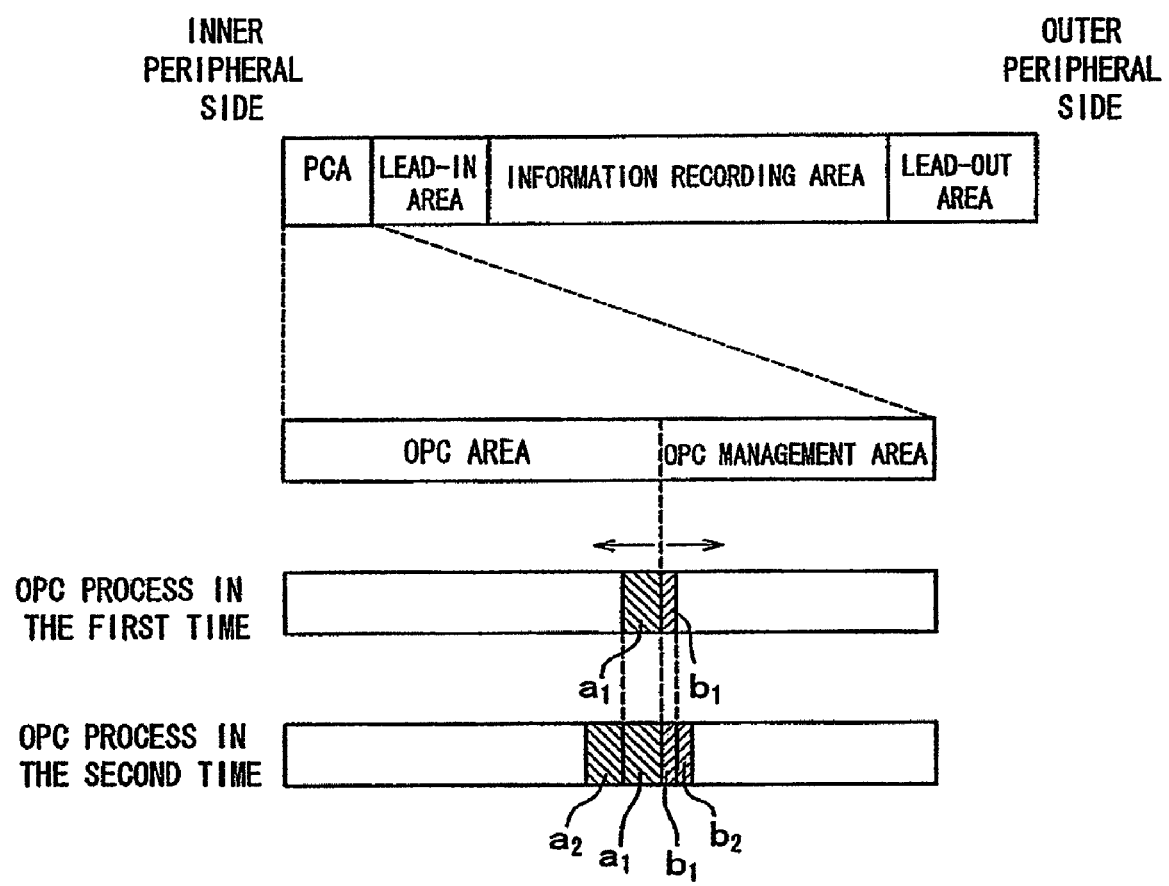
FIG. 11 is a diagram typically illustrating an area structure of a known optical recording medium (CD-R), and optimization of a recording power.
Figure 12:
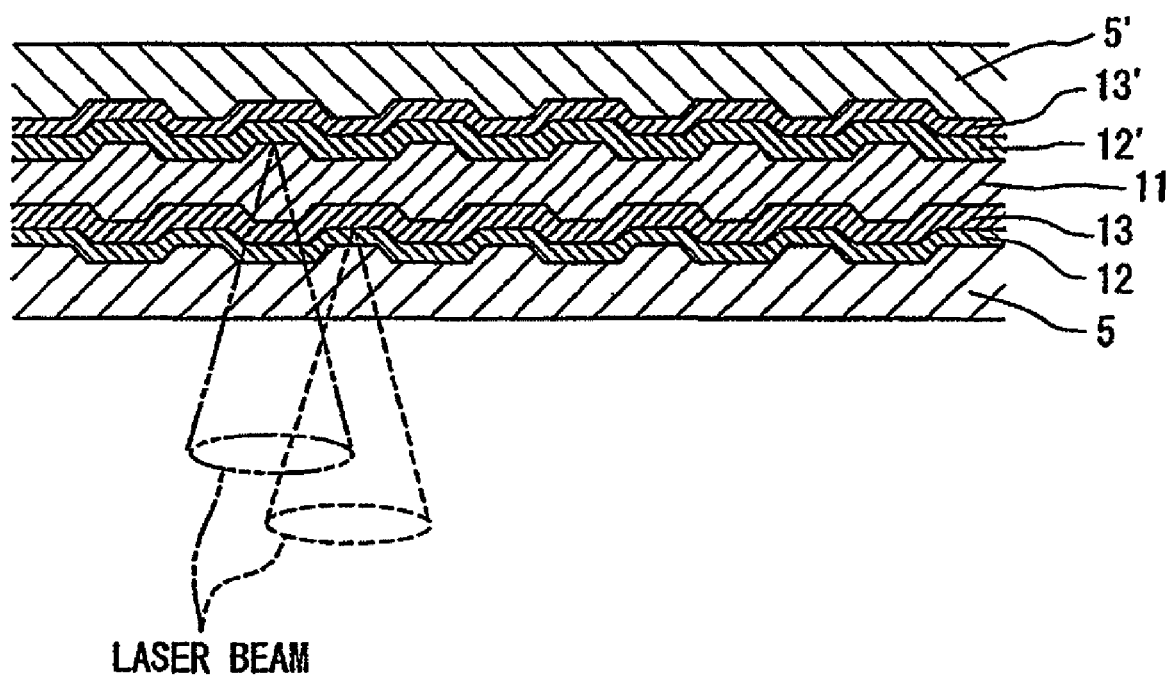
FIG. 12 is a diagram typically showing a known dual-layer optical recording medium.

FIG. 10(B) is a diagram showing a relationship between positions in the radial direction on the optical recording medium 251 and recording powers (laser powers) of the laser beam outputted from the semiconductor laser 253 at the time that the running OPC is not performed. In FIG. 10(B), the optimum power (OPC recording power) obtained in the OPC is denoted by Popc.

If the running OPC is not performed during data recording on the optical recording medium 251 from the inner peripheral side toward the outer peripheral side, the recording power (laser power) of the laser beam outputted from the semiconductor laser 253 tends to be gradually decreased, as shown in FIG. 10(B).

For this, the actual recording power at positions on the side that the data recording is ended is smaller than the optimum power (OPC recording power) Popc obtained in the OPC. Incidentally, if the recording is performed without the running OPC, the asymmetry gradually decreases.

If the running OPC is not performed, the actual laser current value remains unchanged relative to the laser current value Iopc corresponding to the optimum power (OPC recording power) Popc obtained in the OPC, but the actual recording power changes relative to the optimum power (OPC recording power) Popc obtained in the OPC, as above. For this reason, the recording power (laser current value) is set in a manner to be described later to be used when the recording on the first recording layer 2 (22) is started.

When the recording of the data on the second recording layer 5 (25) is completed, the control arithmetic unit 260 sets the recording power (here, a laser current value corresponding to the recording power) to be used when the recording on the first recording layer 2 (22) is started in the following manner (steps A50 and A60; recording power setting step at the starting of the recording). Incidentally, this function of the control arithmetic unit 260 B is referred to as starting point recording power setting unit.

In concrete, when the recording in the second recording layer 5 (25) is completed, the control arithmetic unit 260 determines how much the actual recording power changes relative to the optimum power to the second recording layer 5 (25) obtained beforehand at step A30 (step A50).

In this embodiment, the control arithmetic unit 260 stores the recording power (laser current value corresponding to the recording power) which is set to record the last data on the second recording layer 5 (25) (data recorded at the last address of the recorded data recorded on the second recording layer) in the memory 260B.

When the recording on the second recording layer 5 (25) is completed, the control arithmetic unit 260 reads out the optimum power to the second recording layer 5 (25) (OPC recording power; laser current value corresponding to the optimum power) which is stored in the memory 260B and the recording power (laser current value corresponding to the recording power) set to record the last data on the second recording layer 5 (25), and obtains a difference between the recording power used to record the last data on the second recording layer 5 (25) and the predetermined optimum power to the second recording layer 5 (25), and calculates the quantity of a change in the actual recording power relative to the optimum power to the second recording layer 5 (25) (step A50). This function of the control arithmetic unit 260 is referred to as a recording power changing quantity calculating unit.

According to this embodiment, the control arithmetic unit 260 subtracts the previously-determined optimum power (laser current value corresponding to the optimum power) to the second recording layer 5 (25) from the recording power (laser current value corresponding to the recording power) used to record the last data on the second recording layer 5 (25), and calculates the quantity of a change in the actual recording power relative to the optimum power to the second recording layer 5 (25) in order to perform the recording while the running OPC is performed.

If the running OPC is not performed, a temperature sensor or a photodiode for monitoring may be provided to estimate (a change in) the actual recording power on the basis of the temperature of the semiconductor laser 253 or the quantity of the emitted light from the semiconductor laser 253, a difference between the estimated actual recording power and the previously-determined optimum power to the second recording layer 5 (25) may be obtained, and the quantity of a change in the actual recording power relative to the optimum power to the second recording layer 5 (25) may be calculated.

Here, the OPC is performed in each of the PCAs arranged on the inner peripheral side and the outer peripheral side of the data recording area of the second recording layer 5 (25), and the optimum powers obtained in the OPC are stored in the memory 260B, as stated above. For this, the control arithmetic unit 260 reads out both of the optimum recording powers (laser current values corresponding to the respective optimum powers), determines the optimum power (laser current value corresponding to the optimum power) determined by an OPC performed in a PCA which is near a portion on which the last data of the second recording layer 5 (25) is recorded, on the basis of a position in the radial direction where the last data of the second recording layer 5 (25) is recorded and positions in the radial direction of the PCAs on the inner peripheral side and the outer peripheral side of the second recording layer 5 (25), and uses the determined optimum power as the optimum power (laser current value corresponding to the optimum power) to the second recording layer 5 (25).

However, the method for determining the optimum power to the second recording layer 5 (25) is not limited to the above example. For example, it is possible to interpolate values between a position in the radial direction of a PCA on the inner peripheral side of the second recording layer 5 (25) and the optimum power (laser current value corresponding to the optimum power) obtained in the OPC performed in this PCA, and a position in the radial direction of a PCA on the outer peripheral side of the second recording layer 5 (25) and the optimum power (laser current value corresponding to the optimum power) obtained in OPC performed in this PCA, determine the optimum power to a portion (a position in the radial direction) on which the last data of the second recording layer 5 (25) is recorded, and use it as the optimum power to the second recording layer 5 (25).

Alternatively, without taking into consideration a position in the radial direction on the second recording layer 5 (25), it is possible to determine an average value of the optimum powers determined in the OPC performed in the PCAs on the inner peripheral side and the outer peripheral side of the second recording layer 5 (25), and use it as the optimum power to the second recording layer 5 (25), for example.

In this embodiment, the recording power is set in the running OPC on the basis of the quantity of the reflected light beam when data is recorded on the second recording layer 5 (25). Accordingly, this means that the actual recording power (a change therein) is estimated on the basis of the quantity of reflected light from the optical recording medium at the time that the last data is recorded on the second recording layer 5 (25). Incidentally, this function of the control arithmetic unit 260 is referred to as a recording power estimating unit.

When recording is performed while the running OPC is performed as done in this embodiment, the laser current value is set in the feedback control performed as the running OPC on the basis of the quantity of reflected light, as shown in FIG. 9(A) [because it varies with a change in the actual recording power [refer to FIG. 9(B)]]. This means that (a change in) the actual recording power is estimated on the basis of the laser current value set in the running OPC [that is, a laser current value set to record the last data on the second recording layer 5 (25)]. This function of the control arithmetic unit 260 is referred to as a recording power estimating unit.

In other words, obtaining a difference between an actual laser current value set to record the last data on the second recording layer 5 (25) in the feedback control performed as the running OPC on the basis of the quantity of reflected light performed as the running OPC and a laser current value corresponding to the optimum power (OPC recording power) obtained in the OPC on the second recording layer 5 (25) and calculating the quantity of a change in the actual laser current value relative to the laser current value corresponding to the optimum power to the second recording layer 5 (25) is equivalent to obtaining a difference between a recording power used to record the last data of the second recording layer 5 (25) and the previously-determined optimum power to the second recording layer 5 (25) and calculating the quantity of a change in the actual recording power relative to the optimum power to the second recording layer 5 (25).

Here, the quantity of a change in the actual recording power is determined in the feedback control performed as the running OPC on the basis of the quantity of reflected light. Alternatively, it is possible to prepare a relationship between the quantities of reflected light and the recording powers as a table, and determine the quantity of a change in the actual recording power using the table.

Next, the control arithmetic unit 260 corrects the previously-determined optimum power to the first recording layer 2 (22) on the basis of a change in the actual recording power relative to the optimum power to the second recording layer 5 (25), and sets a recording power to be used when the recording on the first recording layer 2 (22) is started (step A60). This function of the control arithmetic unit 260 is referred to as an optimum power correcting unit.

Namely, the control arithmetic unit 260 reads out the optimum power (OPC recording power; a laser current value corresponding to the optimum power) to the first recording layer 2 (22) stored in the memory 260B, and adds the quantity of a change in the actual recording power relative to the optimum power to the second recording layer 5 (25), and sets a recording power to be used when the recording on the first recording layer 2 (22) is started.

When the recording on the first recording layer 2 (22) is continuously performed after the recording on the second recording layer 5 (25), the control arithmetic unit 260 controls the recording power of the semiconductor laser 253 to the recording power (a laser current value corresponding to the recording power) to be used when the recording on the first recording layer 2 (22) is started without performing the OPC for the first recording layer 2 (22), and records a first half continuous data on the first recording layer 2 (22) from the outer peripheral side toward the inner peripheral side (step A70). According to this embodiment, the running OPC is performed when the recording on the first recording layer 2 (22) is performed as well as the recording on the second recording layer 5 (25). This function of the control arithmetic unit 260 is referred to as a data recording unit.

In the above embodiment, the OPC is performed on all the layers before the recording on the optical recording medium 251, data is then recorded on each of the recording layers. However, it is not always necessary to beforehand perform the OPC on all recording layers. When continuous recording is performed on at least two recording layers, the OPC should not be performed before a start of recording on one recording layer after recording on the other recording layer is completed.

In the above embodiment where the running OPC is performed during recording, the control arithmetic unit 260 obtains a difference between a recording power set to record the last data of the second recording layer 5 (25) and the optimum power to the second recording layer 5 (25) when the recording on the first recording layer 2 (22) is started, and calculates the quantity of a change in the actual recording power relative to the optimum power to the second recording layer 5 (25), thereby estimating a change in the actual recording power on the basis of the quantity of reflected light from the optical recording medium 251 obtained when the recording on the second recording layer 5 (25) is ended. However, this recording method is not limited to the above.

For example, the control arithmetic unit 260 may estimate a change in the actual recording power on the basis of the temperature of the semiconductor laser (laser light source) 253 obtained when the recording on the second recording layer 5 (25) is completed. This method can be applied to not only a case where the recording is performed while the running OPC is performed, but also a case where the recording is performed without the running OPC. Incidentally, this function of the control arithmetic unit 260 is referred to as a recording power estimating unit.

In which case, it is preferable that a temperature sensor 261 for detecting the temperature of the semiconductor laser 253 is provided as denoted by a chain double-dashed line in FIG. 3, for example, and the control arithmetic unit 260 monitors the temperature of the semiconductor laser 253 when recording on the second recording layer 5 (25) is performed, and estimates a change in the actual recording power on the basis of the temperature of the semiconductor laser 253 obtained after the recording on the second recording layer 5 (25) is completed (for example, when the last data is recorded).

For example, a table representing a relationship between the temperatures of the semiconductor laser 253 and the recording powers [a relationship of the quantity of a change in the laser power relative to a change in temperature of the semiconductor laser 253], or a table representing a relationship between the temperatures of the semiconductor laser 253 and the wavelengths of the outputted laser beam [a relationship of the quantity of a change in the absorbed quantity of the laser beam by a dye contained in the dye containing recording layer 5 (25) relative to a change in temperature of the semiconductor laser 253] may be beforehand prepared, and a change in the actual recording power may be estimated using these tables on the basis of the temperature of the semiconductor laser 253 obtained after the recording on the second recording layer 5 (25) is completed.

Alternatively, the control arithmetic unit 260 may estimate a change in the actual recording power on the basis of the quantity of an emitted light beam of the semiconductor laser (laser light source) 253 at the time that the last data is recorded on the second recording layer 5 (25) (at the time of completion of the recording), for example. This method can be applied to not only the case where recording is performed while the running OPC is performed but also the case where recording is performed without the running OPC. Incidentally, this function of the control arithmetic unit 260 is referred to as a recording power estimating unit.

In which case, a photodiode for monitoring (optical detector for monitoring) 262 detecting the quantity of a light beam emitted from the semiconductor laser 253 may be provided as denoted by a chain double-dashed line in FIG. 3, for example, and the control arithmetic unit 260 may monitor the quantity of the emitted light beam from the semiconductor laser 253 at the time of recording on the second recording layer 5 (25), and estimate a change in the actual recoding power on the basis of the quantity of the emitted light beam from the semiconductor laser 253 at the time that the recording on the second recording layer 5 (25) is completed.

For example, a table representing a relationship between the quantities of the emitted light beam from the semiconductor laser 253 and the recording powers may be beforehand prepared, and a change in the actual recording power may be estimated on the basis of the temperature of the semiconductor laser 253 at the time of completion of the recording on the second recording layer 5 (25), using the table.

Further, the control arithmetic unit 260 may estimate a change in the actual recording power on the basis of a time period of laser irradiation until the last data is recorded (until the end of the recording) on the second recording layer 5 (25). This method can be applied not only to a case where recording is performed while the running OPC is performed but also a case where recording is performed without the running OPC. Incidentally, this function of the control arithmetic unit 260 is referred to as a recording power estimating unit.

In which case, the control arithmetic unit 260 monitors the time period of laser irradiation when recording on the second recording layer 5 (25) is performed, and estimates a change in the actual recording power on the basis of the time period of the laser irradiation until the end of the recording on the second recording layer 5 (25).

For example, a table representing a relationship between the time periods of laser irradiation and the recording powers is beforehand prepared, and a change in the actual recording power is estimated on the basis of the time period of laser irradiation, using the table.

Further, it is possible to combine these methods and use them. For example, the control arithmetic unit 260 may estimate a change in the actual recording power on the basis of the quantity of the emitted light beam from the semiconductor laser (laser light source) 253 obtained when the recording on the second recording layer 5 (25) is completed, and the temperature of the semiconductor laser (laser light source) 53 obtained after the recording on the second recording layer 5 (25) is completed. This method can be applied to not only a case where recording is performed while the running OPC is performed but also a case where recording is performed without the running OPC. Incidentally, this function of the control arithmetic unit 260 is referred to as a recording power estimating unit.

In the above embodiment, the description has been made by way of example where data is continuously recorded on the optical recording medium 251 having the two recording layers 2 and 5 (22 and 25). Accordingly, the data is continuously recorded on the neighboring two recording layers. However, when data is continuously recorded on an optical recording medium having three or more recording layers, for example, the recording is not necessarily performed continuously on neighboring recording layers.

[B] Second Embodiment

According to this embodiment, the area structure of the optical recording medium and the optimization of the recording power differ from those of the first embodiment.

Hereinafter, description will be made of the area structure and the optimization of the recording power according to this embodiment.

Figure 6A:
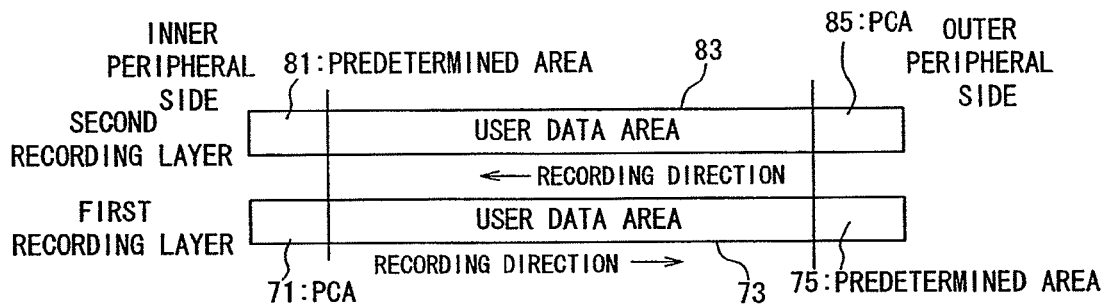
FIG. 6(A) is an area structure diagram for illustrating an area structure of the optical recording media (of the type 1 and the type 2), and optimization of a recording power according to a second embodiment of this invention.

In this optical recording medium (of the type 1 and the type 2), recording is performed on the first recording layer 2 or 22 from the inner peripheral side toward the outer peripheral side, after that, the recording is performed on the second recording layer 5 or 25 from the outer peripheral side toward the inner peripheral side, as shown in FIG. 6(A).

In this optical recording medium, optimization (OPC) of the recording power of the laser beam is performed for each of the recording layers using PCAs before actual recording is started on each of the recording layers, as well.

As shown in FIG. 6(A), a PCA 71, a user data area 73 and a predetermined area 75 are arranged in order on the first recording layer 2 or 22 of this optical recording medium from the inner peripheral side toward the outer peripheral side of the disk.

On the second recording layer 5 or 25, a predetermined area 81, a user data area 83 and a PCA 85 are arranged in order from the inner peripheral side toward the outer peripheral side of the disk.

Each of the user data areas 73 and 83 includes a lead-in area, an information recording area, a lead-out area, etc.

Figure 6B:
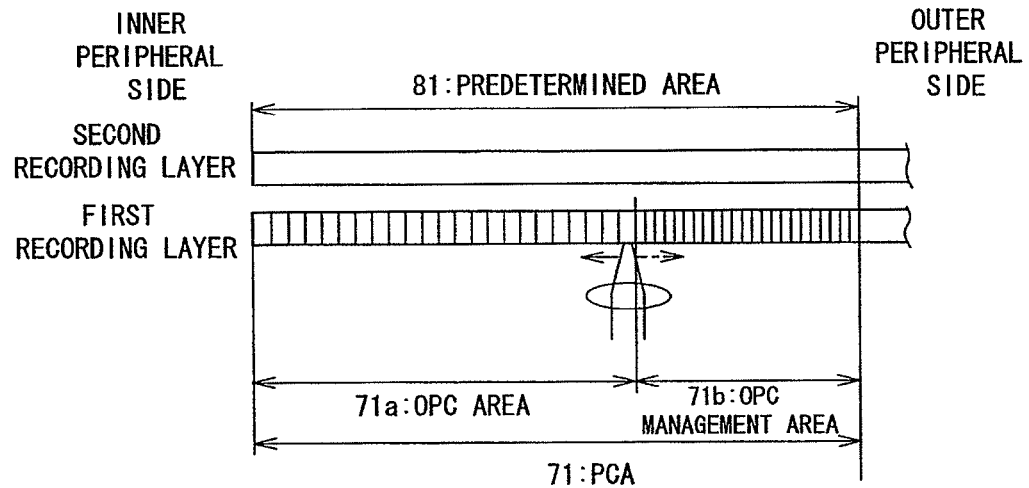
FIGS. 6(B) and 6(C) are enlarged diagrams of essential parts in FIG. 6(A)

As shown in FIG. 6(B), the PCA 71 of the first recording layer 2 or 22 is divided into an OPC area 71a for trial writing by irradiating the laser beam, and an OPC management area 71b for recording the number of time the trial writing has been performed. Each of the areas 71a and 71b consists of a plurality of partitions, and one partition (2418 bytes) is used in each of the regions 71a and 72b for one OPC process. Incidentally, the partitions in the OPC area 71a are used from the outer peripheral side toward the inner peripheral side, whereas the partitions in the OPC management area 71b are used from the inner peripheral side toward the outer peripheral side, for example.

When recording on the first recording layer 2 or 22 is performed with a laser beam, trial writing is performed by irradiating laser beams having various powers on one partition in the OPC area 71a, the records written on trials and reading-out are repetitively done, a recording power of the laser beam at which the data can be read most appropriately is determined, and a state of use of the OPC area 71a such as the number of times the trial writing has been performed, etc. is written in one partition in the OPC management area 71b.

Figure 6C:
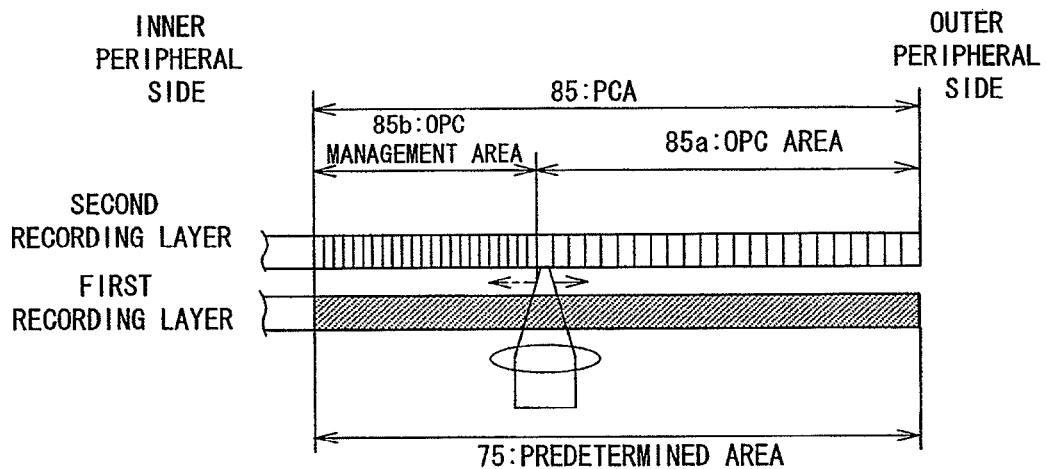

As shown in FIG. 6(C), the PCA 85 of the second recording layer 5 or 25 is divided into an OPC area 85a for performing trial writing by irradiating the laser beam, and an OPC management area 85b for recording the number of times the trial writing has been performed. Each of the areas 85a and 85b consists of a plurality of partitions, and one partition is used in each of the regions 85a and 85b for one OPC process. Incidentally, the partitions in the OPC area 85a are used from the inner peripheral side toward the outer peripheral side, whereas the partitions in the OPC management area 85b are used from the outer peripheral side toward the inner peripheral side, for example.

When recording on the second recording layer 5 or 25 is performed with a laser beam, trial writing is performed by irradiating laser beams having various powers on one partition in the OPC area 85a to write on trials, the records written on trials are repetitively read, a recording power of the laser beam at which the data can be read most appropriately is determined, and a state of use of the OPC area 85a such as the number of times the trial writing has been performed, etc. is written in one partition in the OPC management area 85b.

Meanwhile, the predetermined area 81 of the second recording layer 5 or 25 is in a state where nothing is recorded. The second recording layer 5 or 25 is in the un-recorded state when recording on the first recording layer 2 or 22 is performed because recording on the second recording layer 5 or 25 is performed after recording on the first recording layer 2 or 22 is completed in this optical recording medium, as stated above. For this, by making the predetermined area 81 in the un-recorded state like the second recording layer 5 or 25, it is possible to perform the OPC process on the first recording layer 2 or 22 in a state closer to the actual recording state.

On the other hand, the predetermined area 75 of the first recording layer 2 or 22 is in the previously-recorded state. In this optical recording medium, since the recording on the second recording layer 5 or 25 is performed after recording on the first recording layer 2 or 22 is completed, the first recording layer is already in the recorded state when recording on the second recording layer 5 or 25 is performed. For this, by making the predetermined area 75 in the recorded state, it is possible to perform the OPC process on the second recording layer in a state closer to the actual recording state.

When the applied medium is a DVD-R, it is preferable that recording in conformity with EFM+, which is a recording method for DVD-R, is performed in the predetermined area 75. For example, the length of a mark or space is within a range of 3 T to 14 T when the reference clock cycle for recording is T, and a ratio of mark to space is 0.9 to 1.1, more preferably 1.0 (that is, 50% duty). As this, it is preferable that data is recorded in the same method as the recording method generally used for data recording in the applied medium.

Recording on the predetermined area 75 may be performed by the manufacturer when the disk is manufactured, or by the user with a drive after the user purchases the disk. In either case, it is only necessary that the predetermined area 75 is in the previously-recorded state before the first OPC process is started on the second recording layer 5 or 25.

In this optical recording medium having the above structure, the OPC process for the first recording layer 2 or 22 is performed in the PCA 71 of the first recording layer 2 or 22 before recording on the first recording layer 2 or 22 is started. Since the second recording layer 5 or 25 covered with the OPC area 71a of the first recording layer 2 or 22 when looked from the laser beam is in the un-recorded state at this time, it is possible to perform the OPC process for the first recording layer 2 or 22 in a state closer to the actual recording state, and determine the optimum recording power to the first recording layer 2 or 22.

When recording on the first recording layer is started thereafter, the OPC process for the first recording layer 2 or 22 is performed, using the PCA 71 of the first recoding layer 2 or 22.

When recording on the entire area of the first recording layer 2 or 22 is completed, the OPC process for the second recording layer 5 or 25 is performed, using the PCA 85 of the second recording layer 5 or 25. Since the first recording layer 2 or 22 overlapping when looked from the laser beam on the OPC area 85a of the second recording layer 2 or 25 is in the previously-recorded state, it is possible to perform the OPC process on the second recording layer 5 or 25 in a state closer to the actual recording state, and determine the optimum recording power to the second recording layer 5 or 25.

By arranging the OPC area 85a of the second recording layer 5 or 25 so as not to be overlapped on the OPC area 71a of the first recording layer 2 or 22, it is possible to perform the OPC process for the second recording layer 5 or 25 without affected by the recording state of the OPC area 71a of the first recording layer 2 or 22, thereby to determine the optimum recording power to the second recording layer 5 or 25.

Like the first embodiment, a recommended recording power value of the laser beam may be beforehand recorded in the medium. By doing so, it becomes possible to determine the optimum recording power more quickly by referring to the recommended recording power when the OPC process is executed.

In this embodiment, the second recording layer 5 or 25 covered with the OPC area 71a of the first recording layer 2 or 22 is in the un-recorded state. However, it is preferable that at least a part of the second recording layer 5 or 25 is in the un-recorded state. The first recording layer 2 or 22 overlapping on the OPC area 85a of the second recording layer 5 or 25 is in the previously-recorded state. However, it is preferable that at least a part of the first recording layer 2 or 22 is in the previously-recorded state.

As shown in FIG. 6(A), it is preferable that each of the PCA 71 and 85 is arranged at a position close to a position at which recording is started because of the accessibility of the laser beam.

[C] Third Embodiment

According to this embodiment, the area structure of the optical recording medium and the recording power optimization differ from those according to the first embodiment.

Hereinafter, description will be made of the area structure of the optical recording medium and the recording power optimization according to this embodiment.

Figure 7A:
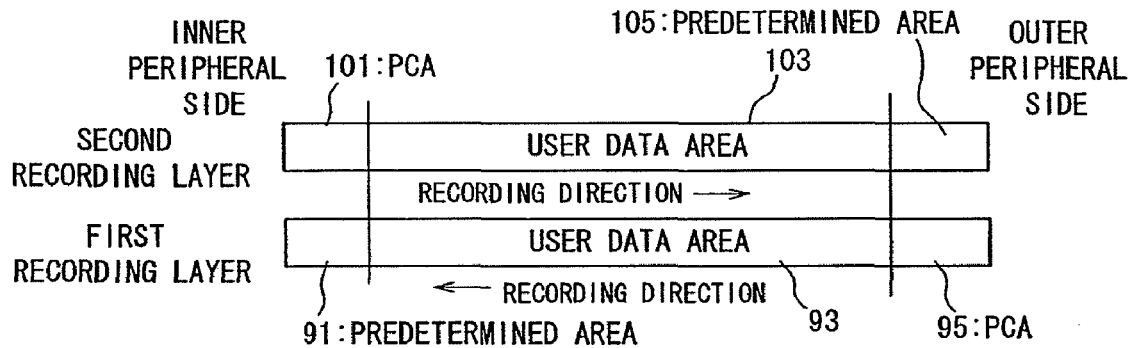
FIG. 7(A) is an area structure diagram for illustrating an area structure of the optical recording media (of the type 1 and the type 2), and optimization of a recording power according to a third embodiment of this invention.

As shown in FIG. 7(A), in this optical recording medium (Type 1 and Type 2), recording is performed on the second recording layer 5 or 25 from the inner peripheral side toward the outer peripheral side, after that, recoding is performed on the first recording layer 2 or 22 from the outer peripheral side toward the inner peripheral side thereof.

In this optical recording medium, before recording is actually performed on each of the recording layers, optimization of the recording power of the laser beam (OPC) for each of the recording layer is performed, using PCAs.

As shown in FIG. 7(A), a PCA 101, a user data area 103 and a predetermined area 105 are arranged in order on the second recording layer 5 or 25 of this optical recording medium from the inner peripheral side toward the outer peripheral side of the disk.

On the first recording layer 2 or 22, a predetermined area 91, a user data area 93 and a PCA 95 are arranged in order from the inner peripheral side toward the outer peripheral side of the disk.

Each of the user data areas 93 and 103 includes a lead-in area, an information recording area, a lead-out area, etc.

Figure 7B:
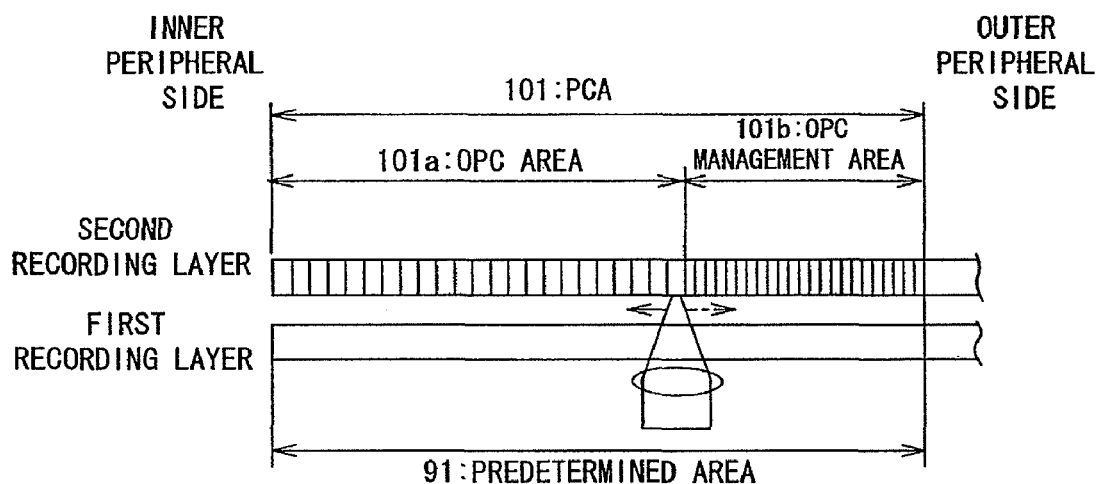
FIGS. 7(B) and 7(C) are enlarged diagrams of essential parts in FIG. 7(A)

As shown in FIG. 7(B), the PCA 101 of the second recording layer 5 or 25 is divided into an OPC area 101a for performing trial writing by irradiating laser beams, and an OPC management area 101b for storing the number of times the trial writing has been performed, etc. Each of the areas 101a and 101b consists of a plurality of partitions, and one partition (2418 byte) is used for one OPC process in each of the areas 101a and 101b. Incidentally, the partitions in the OPC area 101a are used from the outer peripheral side toward the inner peripheral side, whereas the partitions in the OPC management area 101b are used from the inner peripheral side toward the outer peripheral side, for example.

When recording on the second recording layer 5 or 25 is performed with the laser beam, trial writing is performed by radiating laser beams having various powers on one partition in the OPC area 101a, the records written on trials are repetitively read, a recording power of the laser beam that can read most appropriately is determined, and the state of use of the OPC area 101a such as the number of times the trial writing has been performed, etc. is recorded in one partition in the OPC management area 101b.

Figure 7C:
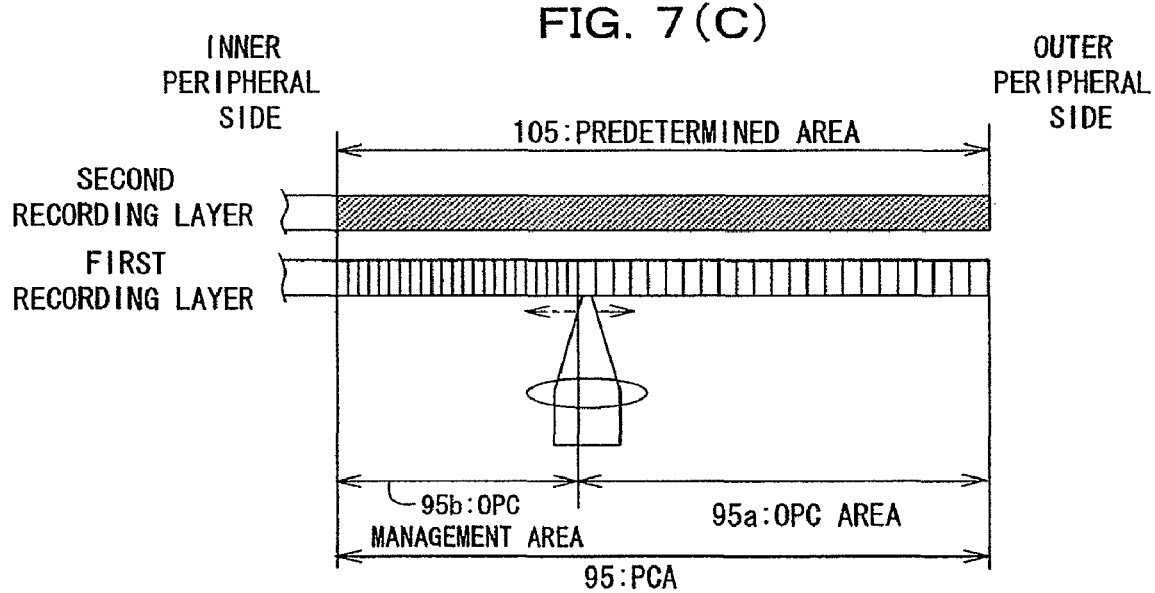

As shown in FIG. 7(C), the PCA 95 of the first recording layer 2 or 22 is divided into an OPC area 95a for performing trial writing by irradiating laser beams, and an OPC management area 95b for storing the number of times the trial writing has been performed, etc. Each of the areas 95a and 95b consists of a plurality of partitions, and one partition (2418 byte) is used for one OPC process in each of the areas 95a and 95b. Incidentally, the partitions in the OPC area 95a are used from the inner peripheral side toward the outer peripheral side, whereas the partitions in the OPC management area 95b used from the outer peripheral side toward the inner peripheral side, for example.

When recording on the first recording layer 2 or 22 is performed with the laser beam, trial writing is performed by irradiating laser beams having various powers on one partition in the OPC area 95a, the records written on trials and reading-out are repetitively done, a recording power of the laser beam that can read most appropriately is determined, and the state of use of the OPC area 95a such as the number of times the trial writing has been performed, etc. is recorded in one partition in the OPC management area 95b.

Meanwhile, the predetermined area 91 of the first recording layer 2 or 22 is in a state where nothing is recorded (un-recorded state). Since recording on the first recording layer 2 or 22 is performed after recording on the second recording layer 5 or 25 is completed in this optical recording medium, as stated above, the first recoding layer 2 or 22 is in the un-recorded state when recording is performed on the second recording layer 5 or 25. By making the predetermined area 91 in the un-recorded state like the first recording layer 2 or 22, it is possible to perform the OPC process for the second recording layer 5 or 25 in a state closer to the actual recording state.

On the other hand, the predetermined area 105 of the second recording layer 5 or 25 is in the previously-recorded state. Since recording on the first recording layer 2 or 22 is performed after recording on the second recording layer 5 or 25 is completed in this optical recording medium, as stated above, the second recoding layer 5 or 25 is already in the recorded state when recording is performed on the first recording layer 2 or 22. By making the predetermined area 105 in the recorded state like the second recording layer 5 or 25, it is possible to perform the OPC process for the first recording layer 2 or 22 in a state closer to the actual recording state.

When the applied medium is a DVD-R, it is preferable that recording in conformity with EFM+, which is a recording method for DVD-R, is performed in the predetermined area 105. For example, it is preferable that the length of a mark or space is within a range of 3 T to 14 T when the reference clock cycle for recording is T, and the ratio of mark to space is 0.9 to 1.1, more preferably 1.0 (that is, 50% duty). As this, it is preferable that data is recorded in the same method as the recording method generally used for data recording in the applied medium.

Recording in the predetermined area 105 may be performed by the manufacturer when the disk is manufactured, or by the user with a drive after the user purchases the disk. In either case, it is only necessary that the predetermined area 105 of the second recording layer 5 or 25 is in the previously-recorded state before the first OPC process for the first recording layer 2 or 22 is started.

In this optical recording medium having the above structure, the OPC process for the second recording layer 5 or 25 is performed using the PCA 101 of the second recording layer 5 or 25 before recording on the second recording layer 5 or 25 is started. Since the first recording layer 2 or 22 overlapping when looked from the laser beam on the OPC area 101*a* of the second recording layer 5 or 25 is in the un-recorded state at this time, it is possible to perform the OPC process for the second recording layer 5 or 25 in a state closer to the actual recording state, and determine the optimum recording power to the second recording layer 5 or 25.

When recording on the second recording layer 5 or 25 is started thereafter, the OPC process for the second recording layer 5 or 25 is performed, using the PCA 101 of the second recoding layer 5 or 25.

When recording on the entire area of the second recording layer 5 or 25 is completed, the OPC process for the first recording layer 2 or 22 is performed, using the PCA 95 of the first recording layer 2 or 22. Since the second recording layer 5 or 25 overlapped on the OPC area 95*a* of the first recording layer 2 or 22 when looked from the laser beam is in the previously-recorded state, it is possible to perform the OPC process for the first recording layer 2 or 22 in a state closer to the actual recording state, and determine the optimum recording power to the first recording layer 2 or 22.

By arranging the OPC area 95*a* of the first recording layer 2 or 22 so as not to overlap on the OPC area 101*a* of the second recording layer 5 or 25, it is possible to perform the OPC process for the second recording layer 5 or 25 without affected by the recording state of the OPC area 95*a* of the first recording layer 2 or 22, and determine the optimum recording power to the second recording layer 5 or 25.

Like the first embodiment, a recommended recoding power of the laser beam may be beforehand recorded. By doing so, it becomes possible to determine the optimum recording power more quickly by referring to the recommended recording power when the OPC process is executed.

As shown in FIG. 7(A), it is preferable that each of the PCAs 95 an 101 is arranged in a position close to where recording is started because of the accessibility of the laser beam.

[D] Others

Having described the embodiments of the present invention, it is to be understood that the present invention is not limited to be above embodiments, but may be modified in various ways without departing from the scope of the present invention.

For example, this invention can be applied to an optical recording medium having three or more recording layers, on which recording or reading are performed with a laser beam from one side. In which case, the PCA is arranged in each of the recording layers. In such optical recording medium, when the OPC process is performed on a certain recording layer (excepting the first recording layer) $X_n$, the PCA of the recording layer $X_n$ preferably has an area not overlapped on the PCA of a recording layer $X_{n-1}$ positioning in front thereof when looked from the laser beam. Further, it is preferable that a part of the recording layer $X_{n-1}$ overlapping on the PCA of the recording layer $X_n$ looked from the laser beam is in the previously-recorded state.

In the above embodiment, a dye recording medium having a dye recording layer has been described. However, this invention can be applied to a medium of the phase-change type. In the case of a phase-change medium, the first recording layer is comprised of the first protective layer, an information recording layer and the second protective layer, whereas the second recording layer is comprised of the first protective layer, an information recording layer and the second protective layer, although not shown.

As the material of this information recording layer, it is preferable to use a material whose optical constant (refractive index n, extinction coefficient k) is changed by irradiating a laser beam. As such material, there are, chalcogenides based on Te or Se such as alloys containing Ge—Sb—Te, Ge—Te, Pd—Ge—Sb—Te, In—Sb—Te, Sb—Te, Ag—In—Sb—Te, Ge—Sb—Bi—Te, Ge—Sb—Se—Te, Ge—Sn—Te, Ge—Sn—Te—Au, Ge—Sb—Te—Cr, In—Se, In—Se—Co or the like as the main component, and alloys to which nitrogen, oxygen, etc. are appropriately added to the former alloys, for example.

As the material of the first protective layer and the second protective layer, it is preferable to use a material which is physically and chemically stable, has higher melting point than that of the information recording layer and high softening temperature, and is not mutually soluble with the material of the information recording layer in order to suppress an increase in noise due to thermal damage of the protective substrate, the information recording layer and the like at the time of irradiation of the laser beam, adjust the reflectance and absorptivity to the laser beam, the phase of the reflected light, etc. As such material, there are oxides of Y, Ce, Ti, Zr, Nb, Ta, Co, Zn, Al, Si, Ge, Sn, Pb, Sb, Bi, Te or the like, nitrides of Ti, Zr, Nb, Ta, Cr, Mo, W, B, Al, Ga, In, Si, Ge, Sn, Pb or the like, carbides of Ti, Zr, Nb, Ta, Cr, Mo, W, Si or the like, sulfides of Zn, Cd or the like, selenides, tellurides, fluorides of Mg, Ca or the like, simple substances of C, Si, Ge and the like, dielectrics made from mixtures of these, and materials treated in the same way as the dielectrics, for example. For the first protective layer and the second protective layer, different materials may be used as needed, or the same material may be used.

In the case of a rewritable optical recording medium, the OPC process can be repeated in the same partition since it is possible to rewrite signals in the recording layer. Accordingly, the PCA of the rewritable optical recording medium is comprised of only the OPC area, thus the OPC management area for recording the number of times trial writing has been performed, etc. is unnecessary.

In the rewritable optical recording medium, a partition for performing the OPC is arbitrarily selected, and the OPC process is performed after a laser beam for erasing the power beforehand recorded in the selected partition of the medium is emitted and the signals are erased. Since records of signals can be erased in the rewritable recording medium, the order of the recording is not constant in such a way that the second recording layer is recorded after the first recording layer is recorded, thus the order of the recording differs according to the state of use. In the case of the rewritable optical recording medium, it is preferable that the predetermined areas of the first recording layer and the second recording layer are in the recorded state because the OPC process can be performed in a state closer to the actual recording state. However, the present invention is more effective when the present invention is applied to a write-once medium in which data is written in one recording layer, after that, the data is started to be recorded in another recording layer.

This application is based on Japanese Patent Application Number 2002-370934 filed on Dec. 20, 2002, Japanese Patent Application No. 2003-202321 filed on Jul. 28, 2003 and Japanese Patent Application No. 2003-098320 filed on Apr. 1, 2003, the whole contents of which are hereby incorporated by reference.

What is claimed is:

1. An optical recording medium comprising:
   an optical-transmissible first substrate;
   a first recording layer disposed on said first substrate, on which information can be recorded by irradiating a laser beam from the first substrate's side;
   a second recording layer disposed on said first recording layer, on which information can be recorded by irradiating said laser beam; and
   each of said first recording layer and said second recording layer including power calibration areas to optimizing intensity of said laser beam;
   wherein recording of information on said first recording layer and recording of information on said second recording layer are performed forward opposite directions, and
   a part of said first recording layer overlapping on said power calibration area of said second recording layer is in a previously-recorded state.

2. The optical recording medium according to claim 1, wherein recording of information on said first recording layer is performed before recording of information on said second recording layer.

3. An optical recording medium comprising:
   an optical-transmissible first substrate;
   a first recording layer disposed on said first substrate, on which information can be recorded by irradiating a laser beam from the first substrate's side;
   a second recording layer disposed on said first recording layer, on which information can be recorded by irradiating said laser beam; and
   each of said first recording layer and said second recording layer including power calibration areas to optimizing intensity of said laser beam;
   wherein recording of information on said first recording layer and recording of information on said second recording layer are performed forward opposite directions, and
   said power calibration area of said second recording layer has an area not overlapped on said power calibration area of said first recording layer.

4. The optical recording medium according to claim 1, wherein a recommended recording power value for each of said recording layers is beforehand recorded.

5. The optical recording medium according to claim 3, wherein a recommended recording power value for each of said recording layers is beforehand recorded.

6. A recording method for an optical recording medium, said optical recording medium including an optical-transmissible first substrate; a first recording layer disposed on said first substrate, on which information can be recorded by irradiating a laser beam from the first substrate's side; a second recording layer disposed on said first recording layer, on which information can be recorded by irradiating said laser beam; and each of said first recording layer and said second recording layer including power calibration areas to optimizing intensity of said laser beam;
   the method comprising:
   performing recording of information on said first recording layer and recording of information on said second recording layer in forward opposite directions;
   wherein a part of said first recording layer overlapping on said power calibration area of said second recording layer is in a previously-recorded state.

7. The recording method for the optical recording medium according to claim 6, wherein recording of information on said first recording layer is performed before recording of information on said second recording layer.

8. A recording method for an optical recording medium, said optical recording medium including an optical-transmissible first substrate; a first recording layer disposed on said first substrate, on which information can be recorded by irradiating a laser beam from the first substrate's side; a second recording layer disposed on said first recording layer, on which information can be recorded by irradiating said laser beam; and
   each of said first recording layer and said second recording layer including power calibration areas to optimizing intensity of said laser beam;
   the method comprising:
   performing recording of information on said first recording layer and recording of information on said second recording layer in forward opposite directions;
   wherein said power calibration area of said second recording layer has an area not overlapped on said power calibration area of said first recording layer.

9. The optical recording medium according to claim 3, wherein recording of information on said first recording layer is performed before recording of information on said second recording layer.

10. The recording method for the optical recording medium according to claim 8, wherein recording of information on said first recording layer is performed before recording of information on said second recording layer.

* * * * *